(12) United States Patent
Kudo et al.

(10) Patent No.: US 10,579,196 B2
(45) Date of Patent: Mar. 3, 2020

(54) DISPLAY DEVICE WITH IMPROVED TOUCH DETECTION IN PERIPHERAL REGION

(71) Applicant: Japan Display Inc., Tokyo (JP)

(72) Inventors: Michita Kudo, Tokyo (JP); Yasuyuki Teranishi, Tokyo (JP); Takafumi Suzuki, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 16/025,605

(22) Filed: Jul. 2, 2018

(65) Prior Publication Data
US 2019/0012014 A1   Jan. 10, 2019

(30) Foreign Application Priority Data

Jul. 6, 2017 (JP) ................................ 2017-132992

(51) Int. Cl.
| | |
|---|---|
| *G06F 3/044* | (2006.01) |
| *G06F 3/041* | (2006.01) |
| *G02F 1/1333* | (2006.01) |
| *G02F 1/1343* | (2006.01) |
| *G09G 3/36* | (2006.01) |
| *G02F 1/1335* | (2006.01) |

(52) U.S. Cl.
CPC .......... *G06F 3/044* (2013.01); *G02F 1/13338* (2013.01); *G02F 1/134309* (2013.01); *G06F 3/0412* (2013.01); *G06F 3/0416* (2013.01); *G02F 1/13439* (2013.01); *G02F 1/133514* (2013.01); *G09G 3/3648* (2013.01)

(58) Field of Classification Search
CPC .................. G06F 3/0416; G06F 3/044; G06F 2203/04101; G06F 2203/04111
See application file for complete search history.

(56) References Cited

U.S. PATENT DOCUMENTS

| | | | |
|---|---|---|---|
| 2010/0182273 A1 | 7/2010 | Noguchi et al. | |
| 2014/0253501 A1* | 9/2014 | Noguchi | G02F 1/13338 345/174 |
| 2015/0022501 A1* | 1/2015 | Kita | G02F 1/13338 345/174 |

FOREIGN PATENT DOCUMENTS

JP    2009-244958 A    10/2009

* cited by examiner

*Primary Examiner* — Lisa S Landis
(74) *Attorney, Agent, or Firm* — K&L Gates LLP

(57) ABSTRACT

A display device includes a first substrate, a plurality of first electrodes, a second electrode, a third electrode, and a driver. The first electrodes are disposed in a display region of the first substrate. The second electrode faces the first electrodes in a direction perpendicular to the surface of the first substrate and forms capacitance between the second electrode and the first electrodes. The third electrode is provided in a peripheral region positioned on the outside of the display region and does not overlap the first electrodes in planar view. The driver supplies a drive signal to the third electrode and at least one of the first electrodes simultaneously.

20 Claims, 20 Drawing Sheets

FIG.11
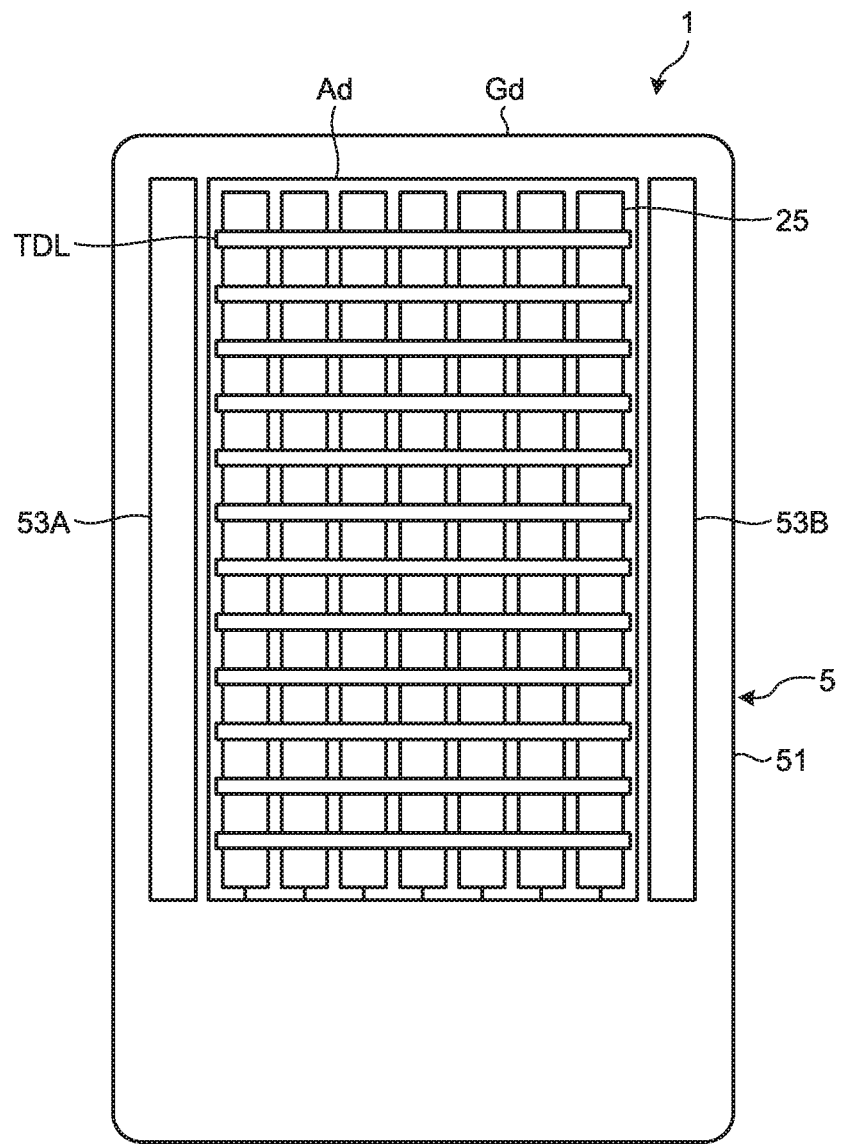
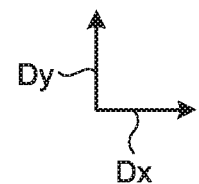

DISPLAY DEVICE WITH IMPROVED TOUCH DETECTION IN PERIPHERAL REGION

CROSS-REFERENCE TO RELATED APPLICATIONS

This application claims priority from Japanese Application No. 2017-132992, filed on Jul. 6, 2017, the contents of which are incorporated by reference herein in its entirety.

BACKGROUND

1. Technical Field

The present disclosure relates to a display device.

2. Description of the Related Art

Touch detection devices capable of detecting an external proximity object, what are called touch panels, have recently been attracting attention. Touch panels are mounted on or integrated with a display device, such as a liquid crystal display device, and used as display devices with a touch detection function (refer to Japanese Patent Application Laid-open Publication No. 2009-244958 (JP-A-2009-244958)). Display devices with a touch detection function include a button having an input function in a peripheral region positioned around a display region. Widely known are techniques for integrating such an input button with the peripheral region of touch panels and display devices. The display device with a touch sensor described in JP-A-2009-244958 includes detection electrodes for a sensor in a frame region of a TFT substrate.

When an input operation performed in the peripheral region is detected using electrodes and a drive configuration for touch detection, the distance between an object to be detected, such as a finger, in the peripheral region and the detection electrodes is large. If the electrodes and the drive configuration for touch detection are used to detect the object to be detected in the peripheral region without any change, it may possibly be difficult to perform detection satisfactorily.

SUMMARY

A display device according to one aspect includes a first substrate, a plurality of first electrodes disposed in a display region of the first substrate, a second electrode facing the first electrodes in a direction perpendicular to a surface of the first substrate and configured to form capacitance between the second electrode and the first electrodes, a third electrode provided in a peripheral region positioned on the outside of the display region and not overlapping the first electrodes in planar view, and a driver configured to supply a drive signal to the third electrode and at least one first electrode out of the first electrodes simultaneously.

BRIEF DESCRIPTION OF THE DRAWINGS

FIG. 11 is a plan view schematically illustrating the display device according to the first embodiment.

DETAILED DESCRIPTION

Figure 1:
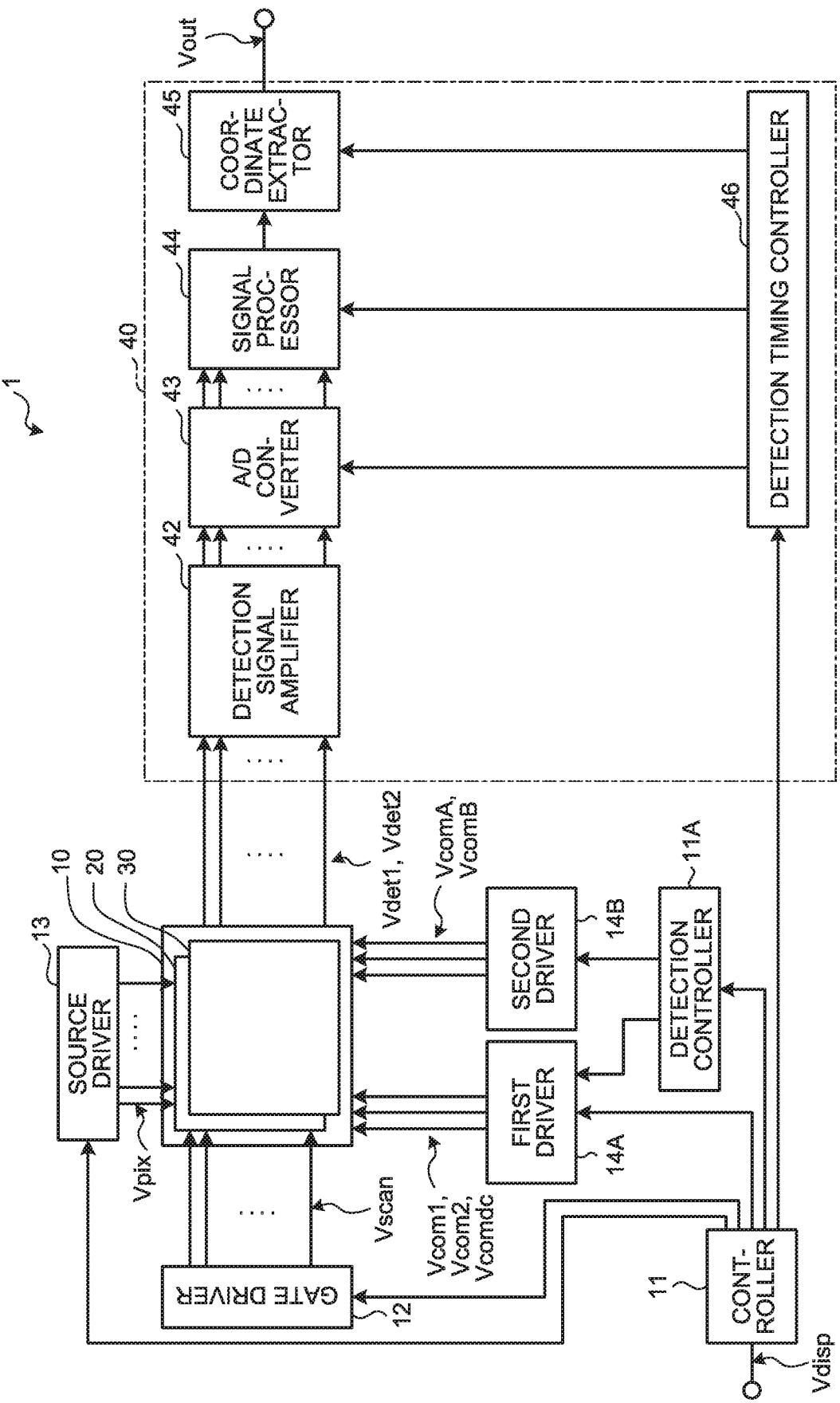
FIG. 1 is a block diagram of an exemplary configuration of a display device according to a first embodiment of the present disclosure.

Exemplary aspects (embodiments) to embody the present disclosure are described below in greater detail with reference to the accompanying drawings. The contents described in the embodiments are not intended to limit the present disclosure. Components described below include components easily conceivable by those skilled in the art and components substantially identical therewith. Furthermore, the components described below may be appropriately combined. What is disclosed herein is given by way of example only, and appropriate modifications made without departing from the spirit of the present disclosure and easily conceivable by those skilled in the art naturally fall within the scope of the disclosure. To simplify the explanation, the drawings may possibly illustrate the width, the thickness, the shape, and other elements of each component more schematically than the actual aspect. These elements, however, are given by way of example only and are not intended to limit interpretation of the present disclosure. In the present specification and the figures, components similar to those previously described with reference to previous figures are denoted by like reference numerals, and detailed explanation thereof may be appropriately omitted.

First Embodiment

FIG. 1 is a block diagram of an exemplary configuration of a display device according to a first embodiment of the present disclosure. As illustrated in FIG. 1, a display device 1 includes a display panel 10, a controller 11, a detection controller 11A, a gate driver 12, a source driver 13, a first driver 14A, a second driver 14B, and a detector 40. The display panel 10 includes a display portion 20 and a touch sensor 30. The display portion 20 displays an image. The touch sensor 30 is a detection device that detects touch input.

The display panel 10 is a display device in which the display portion 20 and the touch sensor 30 are integrated. Specifically, in the display panel 10, part of members, such as electrodes and substrates, of the display portion 20 are also used as electrodes and substrates of the touch sensor 30.

The display portion 20 includes liquid crystal display elements serving as display elements. The display portion 20 includes a plurality of pixels having the display elements and has a display surface facing the pixels. The display portion 20 receives video signals Vdisp to display an image composed of the pixels on the display surface. The display panel 10 may be a device in which the touch sensor 30 is mounted on the display portion 20. The display portion may be an organic electroluminescence (EL) display panel, for example.

The controller 11 supplies control signals to the gate driver 12, the source driver 13, the first driver 14A, the detection controller 11A, and the detector 40 based on the video signals Vdisp supplied from the outside. The controller 11 is a circuit that mainly controls a display operation performed by the display device 1. The detection controller 11A supplies control signals to the first driver 14A and the second driver 14B based on the control signals supplied from the controller 11. The detection controller 11A is a circuit that mainly controls a detection operation performed by the display device 1.

The gate driver 12 supplies scanning signals Vscan to one horizontal line to be a target of display drive in the display panel 10 based on the control signals supplied from the controller 11. As a result, one horizontal line to be a target of display drive is sequentially or simultaneously selected.

The source driver 13 is a circuit that supplies pixel signals Vpix to respective sub-pixels SPix (refer to FIG. 10) of the display portion 20. Part of the functions of the source driver 13 may be provided to the display panel 10. In this case, the controller 11 may generate the pixel signals Vpix and supply them to the source driver 13.

The first driver 14A is a circuit that supplies display drive signals Vcomdc to first electrodes 25 of the display panel 10. The first driver 14A supplies detection drive signals Vcom1 to the first electrodes 25 or supplies detection drive signals Vcom2 to third electrodes 53A and 53B in mutual capacitance touch detection. The second driver 14B supplies drive signals VcomA to the first electrodes 25 or supplies drive signals VcomB to second electrodes TDL in self-capacitance touch detection.

The controller 11 according to the present embodiment performs, in a time-division manner, a display operation of causing the display portion 20 to perform display and a detection operation of causing the touch sensor 30 to detect an object to be detected. The first driver 14A supplies the drive signals Vcom1 and Vcom2 to the first electrodes 25 and the third electrodes 53A and 53B, respectively, based on the control signals supplied from the controller 11. The second driver 14B supplies the drive signals VcomA and VcomB to the first electrodes 25, the second electrodes TDL, and the third electrodes 53A and 53B based on the control signals supplied from the detection controller 11A.

The touch sensor 30 performs touch detection based on the basic principle of touch detection by a mutual capacitance method (also referred to as a mutual method). If the touch sensor 30 detects an object to be detected in a contact state, the touch sensor 30 outputs detection signals Vdet1 to the detector 40. The touch sensor 30 can also perform touch detection based on the basic principle of touch detection by a self-capacitance method (also referred to as a self-method). If the touch sensor 30 detects an object to be detected in the contact state by the self-capacitance method, the touch sensor 30 outputs detection signals Vdet2 to the detector 40.

In the present specification, a "contact state" indicates a state where the object to be detected is in contact with the display surface or in proximity to the display surface close enough to consider it in contact therewith. A "non-contact state" indicates a state where the object to be detected is neither in contact with the display surface nor in proximity to the display surface close enough to consider it in contact therewith.

In mutual capacitance touch detection, the detector 40 is a circuit that determines whether a touch is made by an object to be detected on the display surface of the display panel 10 based on the control signals supplied from the controller 11 and on the detection signals Vdet1 output from the display panel 10. In self-capacitance touch detection, the detector 40 determines whether a touch is made by an object to be detected on the display surface of the display panel based on the control signals supplied from the controller 11 and on the detection signals Vdet2 output from the display panel 10. If a touch is detected, the detector 40 calculates the coordinates at which the touch input is made, for example.

The detector 40 includes a detection signal amplifier 42, an analog/digital (A/D) converter 43, a signal processor 44, a coordinate extractor 45, and a detection timing controller 46. The detection timing controller 46 controls the A/D converter 43, the signal processor 44, and the coordinate extractor 45 such that they operate synchronously with one another based on the control signals supplied from the controller 11.

In touch detection, the detection signal amplifier 42 amplifies the detection signals Vdet1 supplied from the display panel 10. The A/D converter 43 samples analog signals output from the detection signal amplifier 42 at a timing synchronized with the drive signals Vcom1 and Vcom2, thereby converting the analog signals into digital signals.

The signal processor 44 is a logic circuit that determines whether a touch is made on the display panel 10 based on the output signals from the A/D converter 43. The signal processor 44 performs processing of extracting a signal (absolute value |ΔV|) of the difference between the detection signals caused by a finger. The signal processor 44 compares the absolute value |ΔV| with a predetermined threshold voltage. If the absolute value |ΔV| is lower than the threshold voltage, the signal processor 44 determines that an object to be detected is in the non-present state. By contrast, if the absolute value |ΔV| is equal to or higher than the threshold voltage, the signal processor 44 determines that an object to be detected is in the contact state or a proximity state. The detector 40 thus can perform touch detection.

The coordinate extractor 45 is a logic circuit that calculates, if the signal processor 44 detects a touch, the touch panel coordinates of the touch. The coordinate extractor 45 outputs the touch panel coordinates as output signals Vout. The coordinate extractor 45 may output the output signals Vout to the controller 11. The controller 11 can perform a predetermined display or detection operation based on the output signals Vout.

The detection signal amplifier 42, the A/D converter 43, the signal processor 44, the coordinate extractor 45, and the detection timing controller 46 of the detector 40 are provided to the display device 1. The configuration is not limited thereto, and all or part of the functions of the detector 40 may be provided to an external control substrate or processor, for example. The coordinate extractor 45, for example, may be provided to an external processor different from the display device 1. In this case, the detector 40 may output the signals processed by the signal processor 44 as the output signals Vout.

Figure 2:
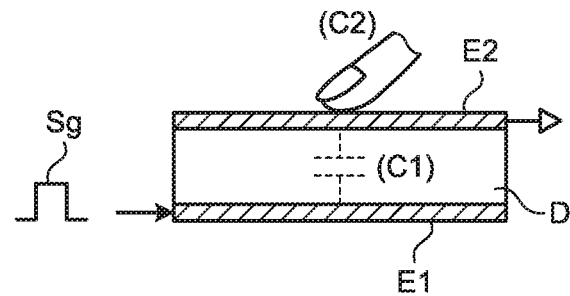
FIG. 2 is a diagram for explaining the basic principle of mutual capacitance touch detection.
Figure 3:
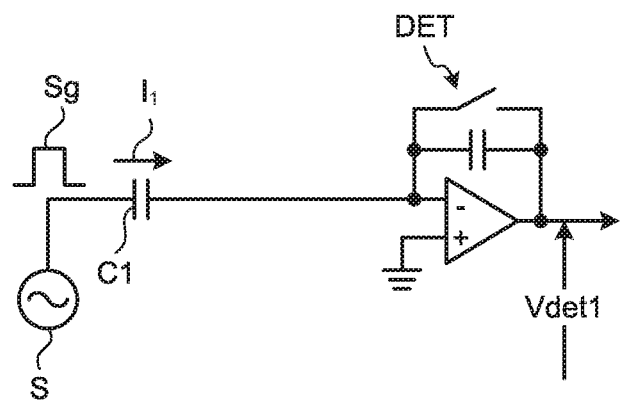
FIG. 3 is a diagram for explaining an example of an equivalent circuit in mutual capacitance touch detection.
Figure 4:
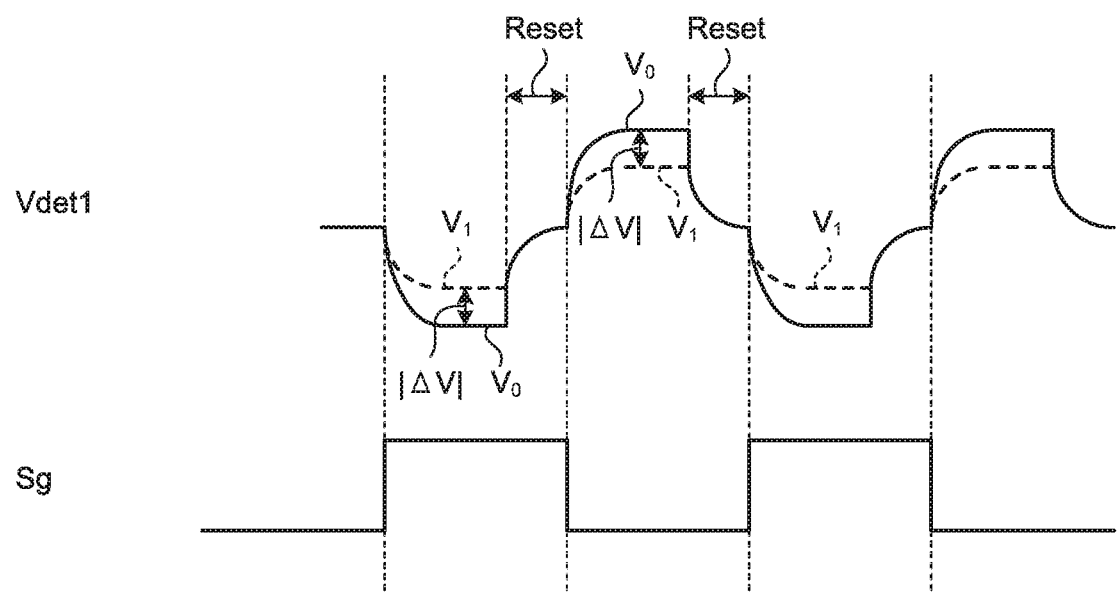
FIG. 4 is a diagram of an example of waveforms of a drive signal and a detection signal in mutual capacitance touch detection.

The following describes the basic principle of mutual capacitance touch detection performed by the display device 1 according to the present embodiment with reference to FIGS. 2 to 4. FIG. 2 is a diagram for explaining the basic principle of mutual capacitance touch detection. FIG. 3 is a diagram for explaining an example of an equivalent circuit in mutual capacitance touch detection. FIG. 4 is a diagram of an example of waveforms of a drive signal and a detection signal in mutual capacitance touch detection. While the following describes a case where a finger is in contact with or in proximity to a detection electrode, the object to be detected is not limited to a finger and may be a stylus, for example.

As illustrated in FIG. 2, a capacitance element C1 includes a pair of electrodes, that is, a drive electrode E1 and a detection electrode E2 facing each other with a dielectric D interposed therebetween. The capacitance element C1 generates fringe lines of electric force extending from ends of the drive electrode E1 to the upper surface of the detection electrode E2 besides lines of electric force (not illustrated) formed between the facing surfaces of the drive electrode E1 and the detection electrode E2. As illustrated in FIG. 3, a first end of the capacitance element C1 is coupled to an alternating-current (AC) signal source (drive signal source) S, and a second end thereof is coupled to a voltage detector DET. The voltage detector DET is an integration circuit included in the detection signal amplifier 42 illustrated in FIG. 1, for example.

When the AC signal source S applies an AC rectangular wave Sg at a predetermined frequency (e.g., several kilohertz to several hundred kilohertz) to the drive electrode E1 (first end of the capacitance element C1), an output waveform (detection signal Vdet1) illustrated in FIG. 4 is generated via the voltage detector DET.

In the non-contact state, an electric current depending on the capacitance value of the capacitance element C1 flows. The voltage detector DET illustrated in FIG. 3 converts fluctuations in the electric current depending on the AC rectangular wave Sg into fluctuations in the voltage (waveform $V_0$ indicated by the solid line (refer to FIG. 4)).

In the contact state, as illustrated in FIGS. 2 and 3, capacitance C2 formed by the finger is in contact with the detection electrode E2 or in proximity to the detection electrode E2 close enough to consider it in contact therewith. The fringe lines of electric force between the drive electrode E1 and the detection electrode E2 are blocked by a conductor (finger). As a result, the capacitance element C1 acts as a capacitance element having a capacitance value smaller than that in the non-contact state. The voltage detector DET converts fluctuations in an electric current $I_1$ depending on the AC rectangular wave Sg into fluctuations in the voltage (waveform $V_1$ indicated by the dotted line (refer to FIG. 4)).

In this case, the waveform $V_1$ has amplitude smaller than that of the waveform $V_0$. Consequently, the absolute value |ΔV| of the voltage difference between the waveform $V_0$ and the waveform $V_1$ varies depending on an effect of an external object, such as a finger, in contact with or in proximity to the detection electrode from the outside. The voltage detector DET resets charge and discharge of a capacitor based on the frequency of the AC rectangular wave Sg by switching in the circuit. With the period Reset, the voltage detector DET can accurately detect the absolute value |ΔV| of the voltage difference.

As described above, the detector 40 compares the absolute value |ΔV| with the predetermined threshold voltage, thereby determining whether the external proximity object is in the non-contact state or in the contact or proximity state. The detector 40 thus can perform touch detection based on the basic principle of mutual capacitance touch detection.

Figure 5:
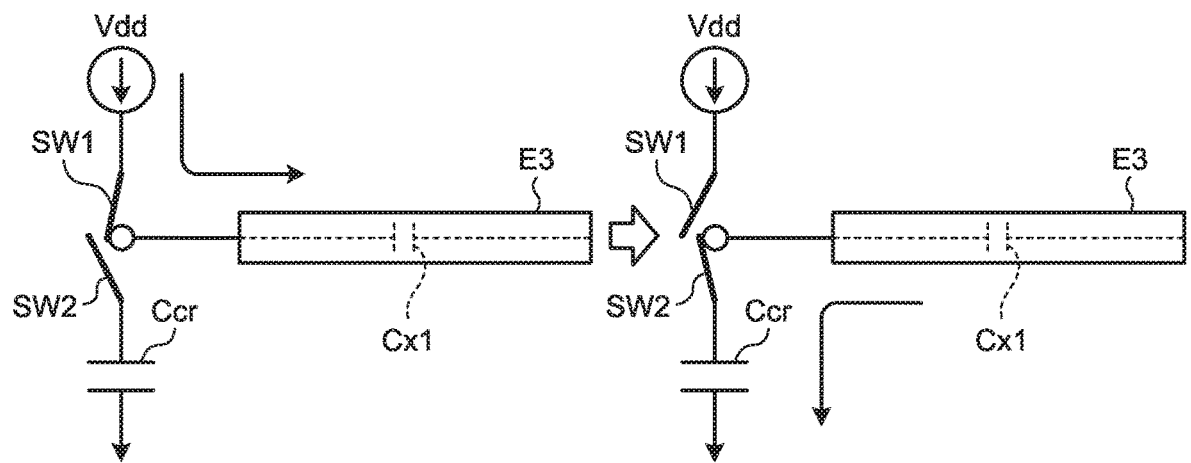
FIG. 5 is a diagram for explaining the basic principle of self-capacitance touch detection and illustrates a non-contact state.
Figure 6:
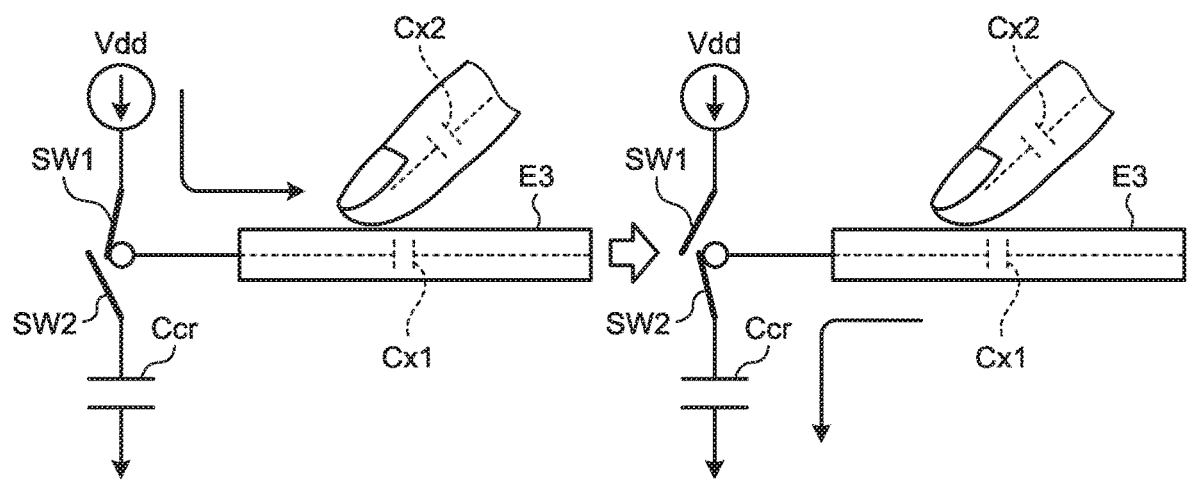
FIG. 6 is a diagram for explaining the basic principle of self-capacitance touch detection and illustrates a contact state.
Figure 7:
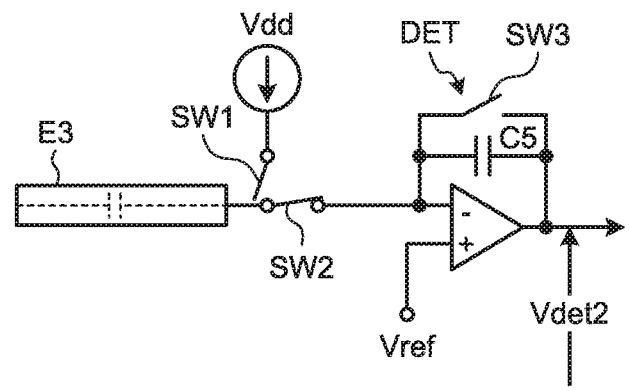
FIG. 7 is a diagram for explaining an example of an equivalent circuit in self-capacitance touch detection.
Figure 8:
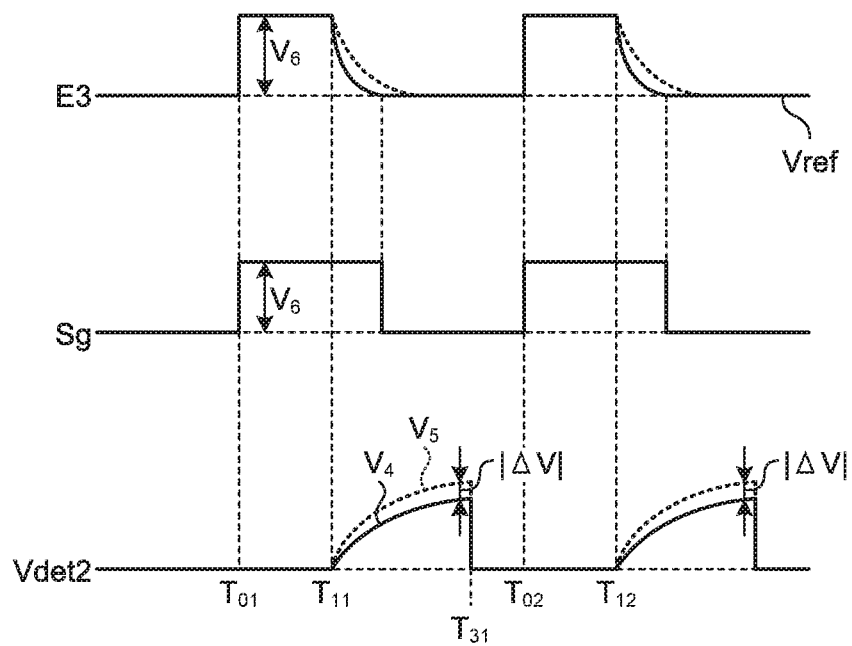
FIG. 8 is a diagram of an example of waveforms of a drive signal and a detection signal in self-capacitance touch detection.

The following describes the basic principle of self-capacitance touch detection with reference to FIGS. 5 to 8. FIG. 5 is a diagram for explaining the basic principle of self-capacitance touch detection and illustrating a non-contact state. FIG. 6 is a diagram for explaining the basic principle of self-capacitance touch detection and illustrating a contact state. FIG. 7 is a diagram for explaining an example of an equivalent circuit in self-capacitance touch detection. FIG. 8 is a diagram of an example of waveforms of a drive signal and a detection signal in self-capacitance touch detection.

The left figure in FIG. 5 illustrates a state where a detection electrode E3 is coupled to a power source Vdd by a switch SW1 but is not coupled to a capacitor Ccr by a switch SW2 in the non-contact state. In this state, capacitance Cx1 in the detection electrode E3 is charged. The right figure in FIG. 5 illustrates a state where coupling between the power source Vdd and the detection electrode E3 is cut off by the switch SW1, and the detection electrode E3 is coupled to the capacitor Ccr by the switch SW2. In this state, an electric charge in the capacitance Cx1 is discharged via the capacitor Ccr.

The left figure in FIG. 6 illustrates a state where the detection electrode E3 is coupled to the power source Vdd by the switch SW1, and the detection electrode E3 is not coupled to the capacitor Ccr by the switch SW2 in the contact state. In this state, capacitance Cx2 generated by the finger in proximity to the detection electrode E3 is also charged besides the capacitance Cx1 in the detection electrode E3. The right figure in FIG. 6 illustrates a state where the detection electrode E3 is not coupled to the power source Vdd by the switch SW1 but is coupled to the capacitor Ccr by the switch SW2. In this state, an electric charge in the capacitance Cx1 and an electric charge in the capacitance Cx2 are discharged via the capacitor Ccr.

Because of the capacitance Cx2, the voltage change characteristics of the capacitor Ccr in discharging (contact state) illustrated in the right figure in FIG. 6 are clearly different from those of the capacitor Ccr in discharging (non-contact state) illustrated in the right figure in FIG. 5. Consequently, the self-capacitance method determines whether an input operation is performed by a finger or the like using the fact that the voltage change characteristics of the capacitor Ccr vary depending on the presence of the capacitance Cx2.

Specifically, an AC rectangular wave Sg (refer to FIG. 8) at a predetermined frequency (e.g., several kilohertz to several hundred kilohertz) is applied to the detection electrode E3. The voltage detector DET illustrated in FIG. 7 converts fluctuations in the electric current depending on the AC rectangular wave Sg into fluctuations in the voltage (waveforms $V_4$ and $V_5$).

In FIG. 8, the voltage level of the AC rectangular wave Sg rises by an amount corresponding to voltage $V_6$ at time $T_{01}$. At this time, the switch SW1 is turned on, and the switch SW2 is turned off. As a result, the electric potential of the detection electrode E3 also rises to voltage $V_6$. Subsequently, the switch SW1 is turned off before time $T_{11}$. While the detection electrode E3 is in a floating state at this time, the electric potential of the detection electrode E3 is maintained at voltage $V_6$ by the capacitance Cx1 (or Cx1+Cx2, refer to FIG. 6) of the detection electrode E3. Subsequently, the voltage detector DET performs a reset operation before time $T_{11}$.

Subsequently, when the switch SW2 is turned on at time $T_{11}$, the electric charge accumulated in the capacitance Cx1 (or Cx1+Cx2) of the detection electrode E3 moves to capacitance C5 in the voltage detector DET. As a result, output from the voltage detector DET increases (refer to the detection signal Vdet2 in FIG. 8). In the non-contact state, the output (detection signal Vdet2) from the voltage detector DET corresponds to the waveform $V_4$ indicated by the solid line, and Vdet2=Cx1×$V_6$/C5 is satisfied. In the contact state, the output corresponds to the waveform $V_5$ indicated by the dotted line, and Vdet2=(Cx1+Cx2)×$V_6$/C5 is satisfied.

Subsequently, at time $T_{31}$, the switch SW2 is turned off, and the switch SW1 and a switch SW3 are turned on. As a result, the electric potential of the detection electrode E3 is reduced to a low level equal to the electric potential of the AC rectangular wave Sg, and the voltage detector DET is reset. The operation described above is repeated at a predetermined frequency (e.g., several kilohertz to several hundred kilohertz). The detector 40 thus can perform touch detection based on the basic principle of self-capacitance touch detection.

Figure 9:
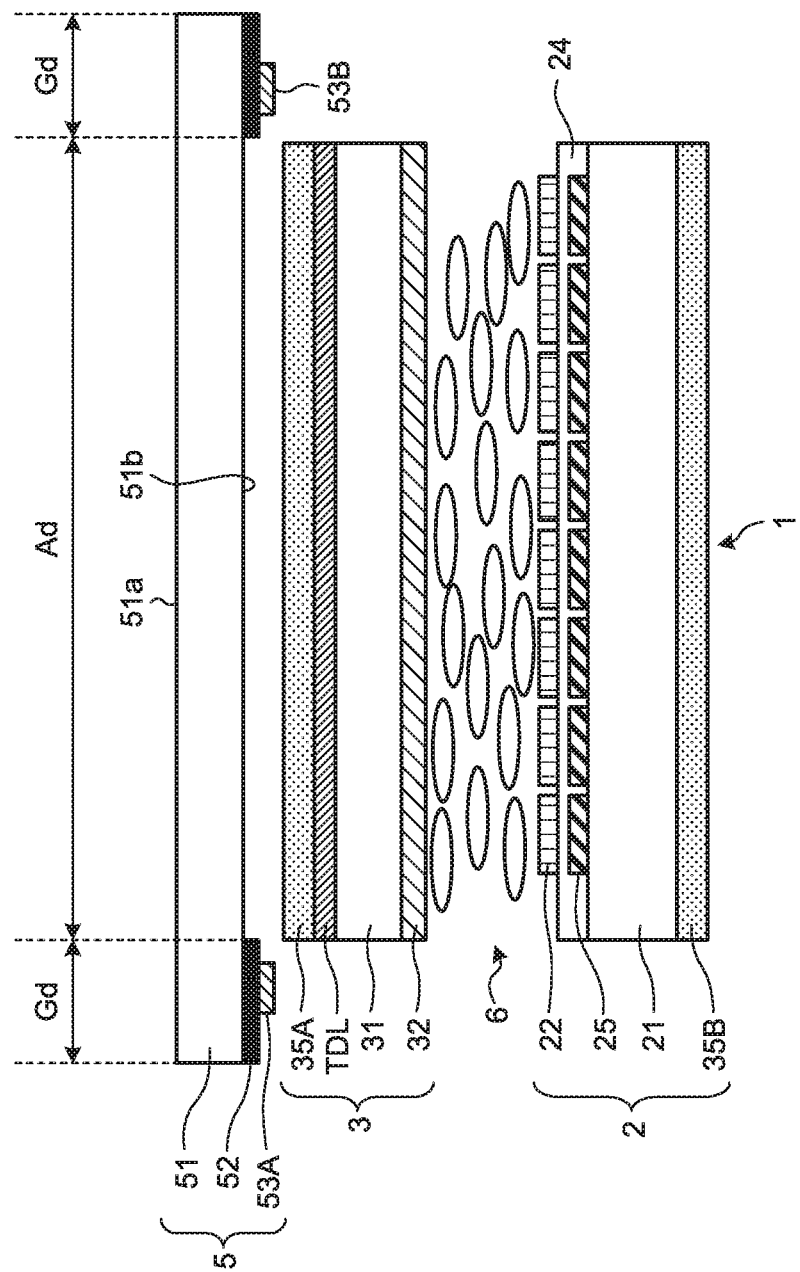
FIG. 9 is a sectional view of a schematic sectional structure of the display device according to the first embodiment.

The following describes an exemplary configuration of the display device 1 according to the present embodiment in greater detail. FIG. 9 is a sectional view of a schematic sectional structure of the display device according to the present embodiment. As illustrated in FIG. 9, the display device 1 includes a pixel substrate 2, a counter substrate 3, a cover member 5, and a liquid crystal layer 6 serving as a display functional layer. The counter substrate 3 is disposed facing the pixel substrate 2 in a direction perpendicular to the surface of the pixel substrate 2. The cover member 5 is disposed facing the counter substrate 3 in a direction perpendicular to the surface of the counter substrate 3 on the opposite side of the pixel substrate 2 across the counter substrate 3. The liquid crystal layer 6 is provided between the pixel substrate 2 and the counter substrate 3.

The pixel substrate 2 includes a first substrate 21, pixel electrodes 22, the first electrodes 25, and a polarizing plate 35B. The first substrate 21 is provided with circuits, such as a gate scanner included in the gate driver 12, switching elements, such as thin film transistors (TFTs), and various kinds of wiring (not illustrated in FIG. 9), such as the gate lines GCL and the signal lines SGL.

The first electrodes 25 are provided on the first substrate 21. The pixel electrodes 22 are provided on the first electrodes 25 with an insulating layer 24 interposed therebetween. The pixel electrodes 22 are provided to a layer different from that of the first electrodes 25 and disposed overlapping the first electrodes 25 in planar view. The pixel electrodes 22 are disposed in a matrix (row-column configuration) in planar view. The polarizing plate 35B is provided under the first substrate 21.

In the present specification, "above" indicates a direction from the first substrate 21 toward a second substrate 31 in the direction perpendicular to the surface of the first substrate 21, and "below" indicates a direction from the second substrate 31 toward the first substrate 21. The "planar view" indicates a view seen in the direction perpendicular to the surface of the first substrate 21.

The pixel electrodes 22 are provided corresponding to the respective sub-pixels SPix constituting each pixel Pix of the display panel 10. The source driver 13 (refer to FIG. 1) supplies the pixel signals Vpix for performing a display operation to the pixel electrodes 22. In the display operation, the display drive signals Vcomdc, which are direct-current (DC) voltage signals, are supplied to the first electrodes 25. As a result, the first electrodes 25 serve as common electrodes for a plurality of pixel electrodes 22. The first electrodes 25 serve as drive electrodes in mutual capacitance touch detection. The first electrodes 25 also serve as detection electrodes in self-capacitance touch detection.

The pixel electrodes 22 and the first electrodes 25 according to the present embodiment are made of a translucent conductive material, such as indium tin oxide (ITO).

The counter substrate 3 includes the second substrate 31, a color filter 32, the second electrodes TDL, and a polarizing plate 35A. The color filter 32 is provided to one surface of the second substrate 31. The second electrodes TDL are provided to the other surface of the second substrate 31. The second electrodes TDL are arrayed on the second substrate 31. The second electrodes TDL serve as detection electrodes in mutual capacitance touch detection and self-capacitance touch detection.

The second electrodes TDL according to the present embodiment are made of a translucent conductive material, such as ITO. Alternatively, the second electrodes TDL may be metal thin wires having a mesh-shaped, zigzag-line-shaped, or wavy-line-shaped pattern. In this case, the second electrodes TDL are metal layers made of one or more of aluminum (Al), copper (Cu), silver (Ag), molybdenum (Mo), chromium (Cr), and tungsten (W).

The color filter 32 faces the liquid crystal layer 6 in the direction perpendicular to the first substrate 21. The color filter 32 may be disposed above the first substrate 21. The first substrate 21 and the second substrate 31 according to the present embodiment are glass substrates or resin substrates, for example.

The first substrate 21 and the second substrate 31 are disposed facing each other with a predetermined space interposed therebetween. The liquid crystal layer 6 is provided between the first substrate 21 and the second substrate 31. The liquid crystal layer 6 modulates light passing therethrough depending on the state of an electric field. The liquid crystal layer 6, for example, includes liquid crystals in a lateral electric-field mode, such as the in-plane switching (IPS) mode including the fringe field switching (FFS) mode. Orientation films (not illustrated in FIG. 9) are provided between the liquid crystal layer 6 and the pixel substrate 2 and between the liquid crystal layer 6 and the counter substrate 3 illustrated in FIG. 9.

The cover member 5 includes a cover substrate 51, a colored layer 52, the third electrodes 53A and 53B. The cover substrate 51 is a protective member that covers and protects the pixel substrate 2 and the counter substrate 3. The cover substrate 51 may be a glass substrate or a film-like substrate made of a resin material, for example. The cover substrate 51 has a first surface 51a and a second surface 51b. The first surface 51a serves as a display surface on which an image is displayed and as a detection surface with or to which an object to be detected is in contact or in proximity. The second surface 51b opposite to the first surface 51a faces the counter substrate 3 and is bonded to the counter substrate 3 with an adhesive layer, which is not illustrated, interposed therebetween.

The colored layer 52 is provided to the second surface 51b of the cover substrate 51. The colored layer 52 is provided in a peripheral region Gd. The colored layer 52 can prevent various kinds of circuits and wires, such as the source driver 13, the first driver 14A, and the second driver 14B, from being visually recognized from the outside. The colored layer 52 is a decorative layer made of a resin material or a metal material colored to suppress transmission of light, for example.

The third electrodes 53A and 53B are disposed at positions overlapping the colored layer 52 on the second surface 51b of the cover substrate 51. The third electrodes 53A and 53B serve as drive electrodes in touch detection of the peripheral region Gd.

An illumination portion (backlight), which is not illustrated, is provided below the first substrate 21. The illumination portion includes a light source, such as a light emitting diode (LED), and outputs light from the light source to the first substrate 21. The light from the illumination portion passes through the pixel substrate 2 and is modulated depending on the state of the liquid crystals at the corresponding position. The state of light transmission to the display surface varies depending on the positions. With this mechanism, an image is displayed on the display surface.

Figure 10:
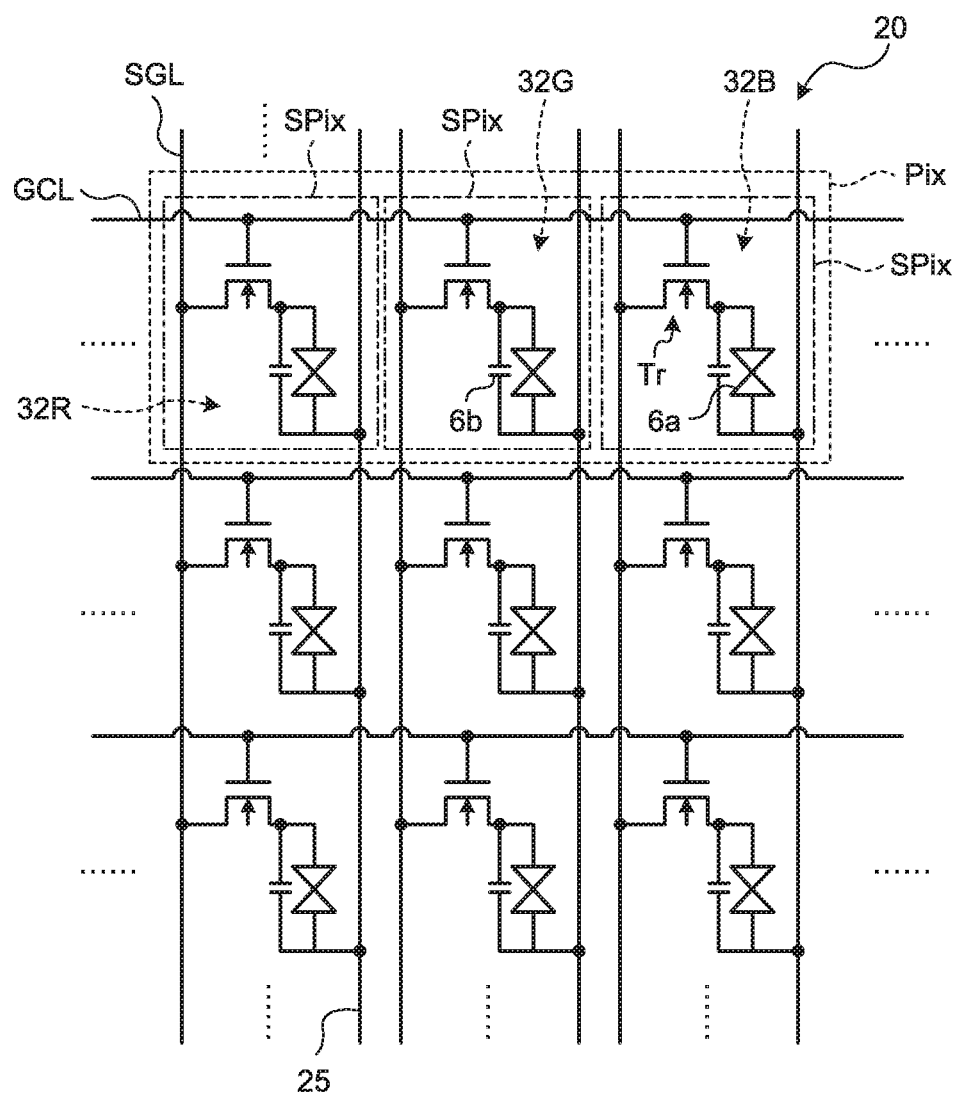
FIG. 10 is a circuit diagram of a pixel array in a display portion.

The following describes a display operation performed by the display panel 10. FIG. 10 is a circuit diagram of a pixel array in the display portion according to the present embodiment. The first substrate 21 (refer to FIG. 9) is provided with switching elements Tr of the respective sub-pixels SPix, the signal lines SGL, the gate lines GCL, and other components as illustrated in FIG. 10. The signal lines SGL are wiring that supplies the pixel signals Vpix to the pixel electrodes 22. The gate lines GCL are wiring that supplies drive signals for driving the switching elements Tr. The signal lines SGL and the gate lines GCL extend on a plane parallel to the surface of the first substrate 21.

The display portion 20 illustrated in FIG. 10 includes a plurality of sub-pixels SPix arrayed in a matrix (row-column configuration). The sub-pixels SPix each include the switching element Tr and a liquid crystal element 6a. The switching element Tr is a thin-film transistor and is an n-channel metal oxide semiconductor (MOS) TFT in this example. The insulating layer 24 is provided between the pixel electrodes 22 and the first electrodes 25 to form holding capacitance 6b illustrated in FIG. 10.

The gate driver 12 illustrated in FIG. 1 sequentially selects the gate line GCL. The gate driver 12 applies the scanning signals Vscan to the gates of the switching elements Tr of the respective sub-pixels SPix via the selected gate line GCL. As a result, one row (one horizontal line) out of the sub-pixels SPix is sequentially selected as a target of display drive. The source driver 13 supplies the pixel signals Vpix to the selected sub-pixels SPix via the signal lines SGL. The sub-pixels SPix perform display in units of one horizontal line based on the supplied pixel signals Vpix.

To perform the display operation, the first driver 14A illustrated in FIG. 1 applies the display drive signals Vcomdc to the first electrodes 25. The display drive signal Vcomdc is a voltage signal serving as a common potential for a plurality of sub-pixels SPix. As a result, the first electrodes 25 serve as common electrodes for the pixel electrodes 22 in the display operation. To perform display, the first driver 14A applies the drive signals Vcomdc to all the first electrodes 25 in a display region Ad.

The color filter 32 illustrated in FIG. 9 may include periodically arrayed color areas of the color filter 32 in three colors of red (R), green (G), and blue (B), for example. Color areas 32R, 32G, and 32B in the three colors of R, G, and B, respectively, serve as a set and correspond to the respective sub-pixels SPix illustrated in FIG. 10. A pixel Pix is composed of a set of sub-pixels SPix corresponding to the respective color areas 32R, 32G, and 32B in the three colors. The color filter 32 may include color areas in four or more colors.

Figure 12:
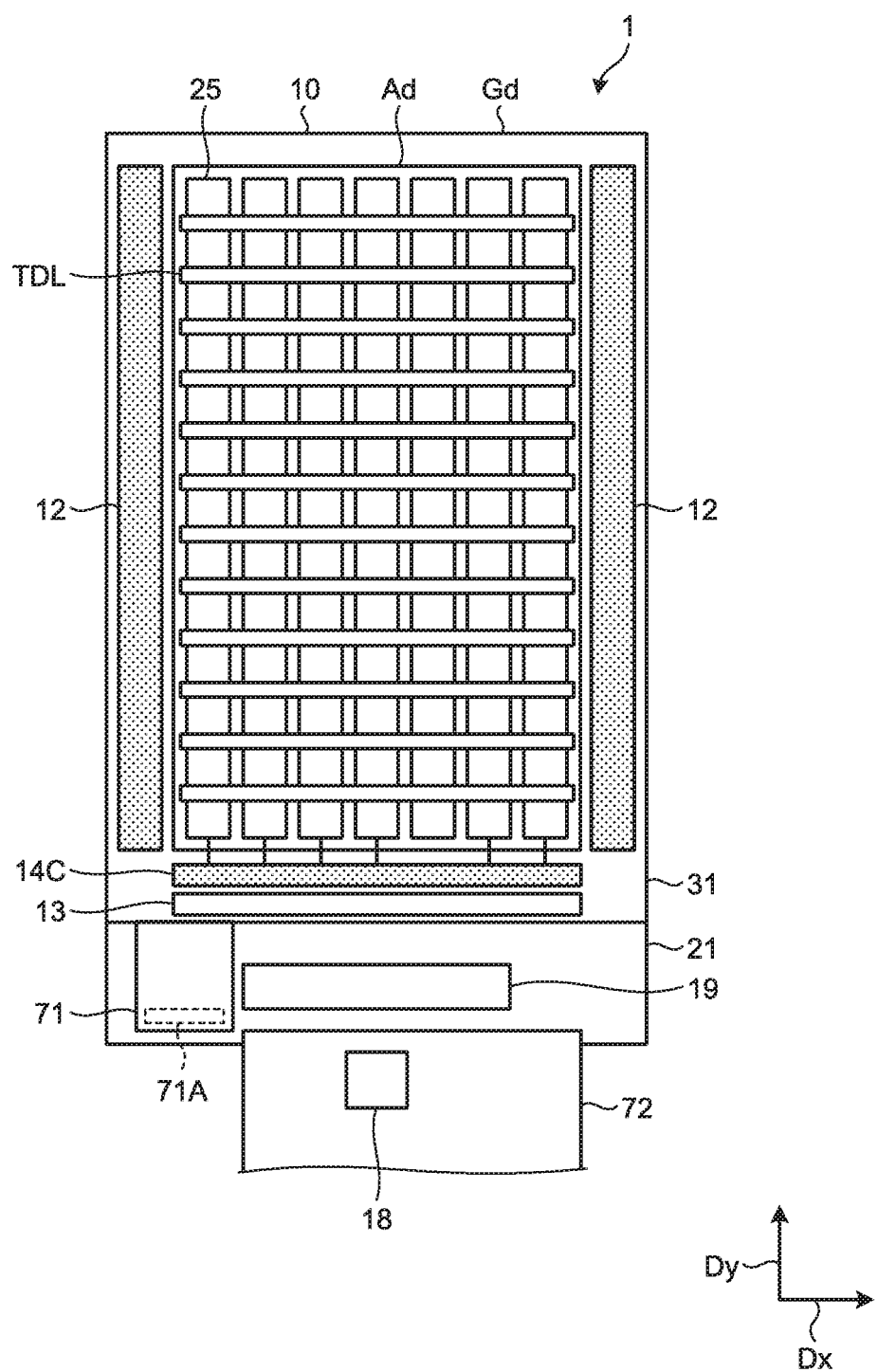
FIG. 12 is a diagram of an example of a module provided with the display device.
Figure 13:
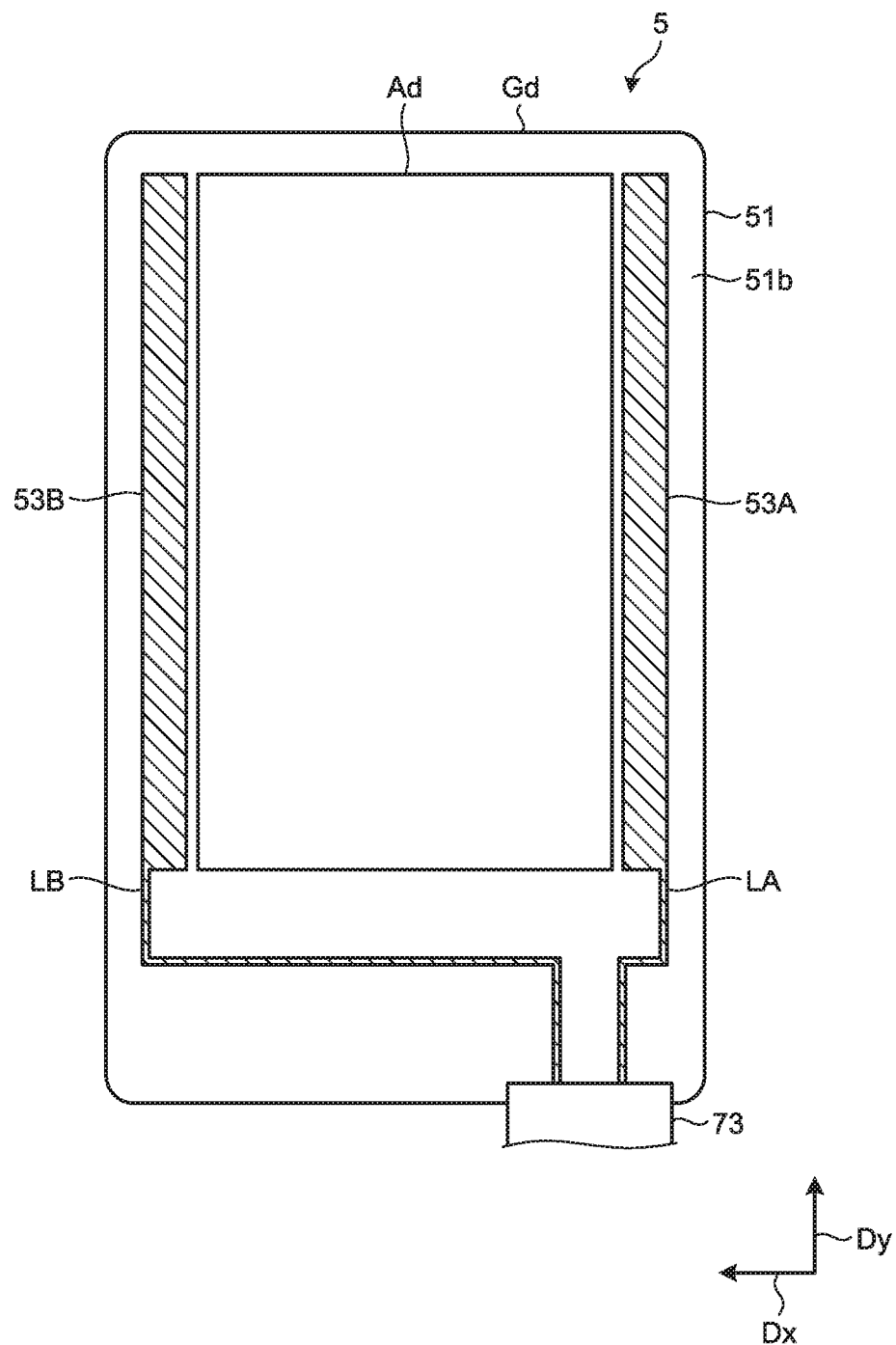
FIG. 13 is a plan view of a cover substrate.

The following describes the configuration of the first electrodes 25, the second electrodes TDL, and the third electrodes 53A and 53B, and a touch detection operation. FIG. 11 is a plan view schematically illustrating the display device according to the first embodiment. FIG. 12 is a diagram of an example of a module provided with the display device. FIG. 13 is a plan view of the cover substrate. FIG. 11 schematically illustrates the positional relation between the first electrodes 25, the second electrodes TDL, and the third electrodes 53A and 53B. FIG. 13 illustrates the second surface 51b of the cover substrate 51.

As illustrated in FIG. 11, the display device 1 has the display region Ad and the peripheral region Gd. In the present specification, the display region Ad is a region for displaying an image and overlapping a plurality of pixels Pix (sub-pixels SPix). The peripheral region Gd is a region positioned on the inner side than the outer periphery of the cover substrate 51 and on the outer side than the display region Ad. The peripheral region Gd may have a frame shape surrounding the display region Ad. In this case, the peripheral region Gd may also be referred to as a frame region.

As illustrated in FIG. 11, the first electrodes 25 and the second electrodes TDL are provided in the display region Ad. The third electrodes 53A and 53B are provided in the peripheral region Gd. As illustrated in FIGS. 11 and 12, the first electrodes 25 extend in a second direction Dy and are arrayed in a first direction Dx. In other words, the first electrodes extend along the long side of the display region Ad and are arrayed in the short side thereof. The first electrodes 25 have a rectangular shape with their long sides extending in the second direction Dy.

The first direction Dx according to the present embodiment extends along one side of the display region Ad. The second direction Dy is orthogonal to the first direction Dx. The configuration is not limited thereto, and the second direction Dy may intersect the first direction Dx at an angle other than 90 degrees. The plane defined by the first direction Dx and the second direction Dy is parallel to the surface of the first substrate 21. The direction orthogonal to the first direction Dx and the second direction Dy is the thickness direction of the first substrate 21.

The second electrodes TDL extend in the first direction Dx and are arrayed in the second direction Dy. The second electrodes TDL intersect the first electrodes 25 in planar view. Capacitance is formed at the intersections of the first electrodes 25 and the second electrodes TDL.

With this configuration, to perform mutual capacitance touch detection, the first driver 14A sequentially scans the first electrodes 25 in a time-division manner and supplies the drive signals Vcom1 thereto. Sensor output signals Vs1 corresponding to changes in capacitance between the first electrodes 25 and the second electrodes TDL are output to the voltage detector DET. The display device 1 thus performs touch detection in the display region Ad.

As illustrated in FIG. 12, a flexible substrate 72 is provided in the peripheral region Gd of the first substrate 21. A scanner 14C, the source driver 13, and a display integrated circuit (IC) 19 are provided in the peripheral region Gd between the ends of the first electrodes 25 and the flexible substrate 72. The scanner 14C is a scanner circuit that sequentially selects the first electrodes 25 to be driven. The gate drivers 12 are provided in the peripheral region Gd along the extending direction of the first electrodes 25, that is, on the long sides of the peripheral region Gd of the first substrate 21. The flexible substrate 72 is provided with a detection IC 18.

A flexible substrate 71 is provided in the peripheral region Gd of the second substrate 31. The flexible substrate 71 is electrically coupled to the display IC 19 or the flexible substrate 72 of the first substrate 21 via a coupling terminal 71A. The second electrodes TDL are electrically coupled to the detection IC 18 via the flexible substrate 71.

The display IC 19 serves as the controller 11 illustrated in FIG. 1. Part of the functions of the detector 40 may be included in the detection IC 18 or provided as functions of an external micro-processing unit (MPU). The configuration of the display IC 19 or the detection IC 18 is not limited thereto, and the display IC 19 or the detection IC 18 may be provided to an external control substrate outside the module, for example. The first driver 14A illustrated in FIG. 1 is included in the display IC 19. The second driver 14B is included in the detection IC 18. The configuration is not limited thereto, and the first driver 14A and the second driver 14B may be provided to the first substrate 21 or an external control substrate.

In the display device 1 according to the present embodiment, the first electrodes 25 extend in a direction intersecting the gate lines GCL (refer to FIG. 10) in planar view. With this configuration, wiring (not illustrated) coupled to the first electrodes 25 and circuits, such as the scanner 14C, can be provided in the peripheral region Gd at a position different from the positions of the gate drivers 12. Specifically, as illustrated in FIG. 12, the gate drivers 12 are provided on the long sides of the peripheral region Gd, and circuits, such as the scanner 14C, and the display IC 19 are provided on the short side thereof, for example. Consequently, the display device 1 according to the present embodiment can make the peripheral region Gd along the first electrodes 25 narrower. The configuration is not limited thereto, and the first electrodes 25 may extend in a direction intersecting the signal lines SGL (refer to FIG. 10), that is, in the first direction Dx. In this case, the second electrodes TDL extend in the second direction Dy so as to intersect the first electrodes 25.

As illustrated in FIG. 11, the third electrode 53A is disposed on one of the sides of the peripheral region Gd facing each other in the first direction Dx, and the third electrode 53B is disposed on the other thereof. The third electrodes 53A and 53B extend in the second direction Dy and are disposed facing each other in the first direction Dx. The first electrodes 25 and the second electrodes TDL are disposed between the third electrodes 53A and 53B in planar view. In other words, the third electrodes 53A and 53B are disposed at positions not overlapping the first electrodes 25 and the second electrodes TDL. The third electrodes 53A and 53B extend in a direction parallel to the first electrodes 25 in planar view. The third electrode 53A is disposed facing one of two outermost first electrodes 25 out of the first electrodes 25 arrayed in the first direction Dx, and the third electrode 53B is disposed facing the other thereof. The third electrodes 53A and 53B are disposed facing the ends of the second electrodes TDL.

The length of the third electrodes 53A and 53B in the second direction Dy is preferably substantially equal to or longer than that of the display region Ad in the second direction Dy. The length of the third electrodes 53A and 53B in the second direction Dy may be shorter than that of the display region Ad in the second direction Dy. The third electrodes 53A and 53B each preferably continuously extend without being electrically separated in a portion along at least one side of the display region Ad.

As illustrated in FIG. 13, the third electrodes 53A and 53B are provided in the peripheral region Gd on the second surface 51b of the cover substrate 51. The third electrodes 53A and 53B are prevented from being visually recognized from the outside because they are disposed overlapping the colored layer 52. With this configuration, the third electrodes 53A and 53B may be made of a metal material having high conductivity. The third electrodes 53A and 53B are a metal layer made of one or more of aluminum (Al), copper (Cu), silver (Ag), molybdenum (Mo), chromium (Cr), and tungsten (W), for example. Alternatively, the third electrodes 53A and 53B may be made of an alloy including one or more of these metal materials or a multilayered body including a plurality of conductive layers made of these materials.

As illustrated in FIG. 13, a flexible substrate 73 is provided in the peripheral region Gd of the cover substrate 51. The third electrodes 53A and 53B are electrically coupled to the flexible substrate 73 via wires LA and LB, respectively. The flexible substrate 73 is provided in the peripheral region Gd corresponding to the position of the flexible substrates 71 and 72 illustrated in FIG. 12. The flexible substrate 73 is electrically coupled to the first substrate 21 or the flexible substrate 71 or 72 illustrated in FIG. 12. With this configuration, the third electrodes 53A and 53B are electrically coupled to the detection IC 18 and the display IC 19 (refer to FIG. 12).

With the third electrodes 53A and 53B having the configuration described above, the display device 1 can detect touch input performed on the peripheral region Gd based on changes in capacitance between the third electrodes 53A and 53B and the second electrodes TDL provided in the display region Ad.

As illustrated in FIGS. 9, 12, and 13, the third electrodes 53A and 53B are provided to the cover substrate 51 and disposed at a layer different from that of the first electrodes 25 and the second electrodes TDL. This configuration can reduce the width of the peripheral region Gd of the first substrate 21 or the second substrate 31 compared with a case where the third electrodes 53A and 53B are provided in the peripheral region Gd of the first substrate 21 or the second substrate 31. Furthermore, this configuration has less restriction in the positions of various kinds of wiring and circuits provided to the first substrate 21 or the second substrate 31.

Figure 14:
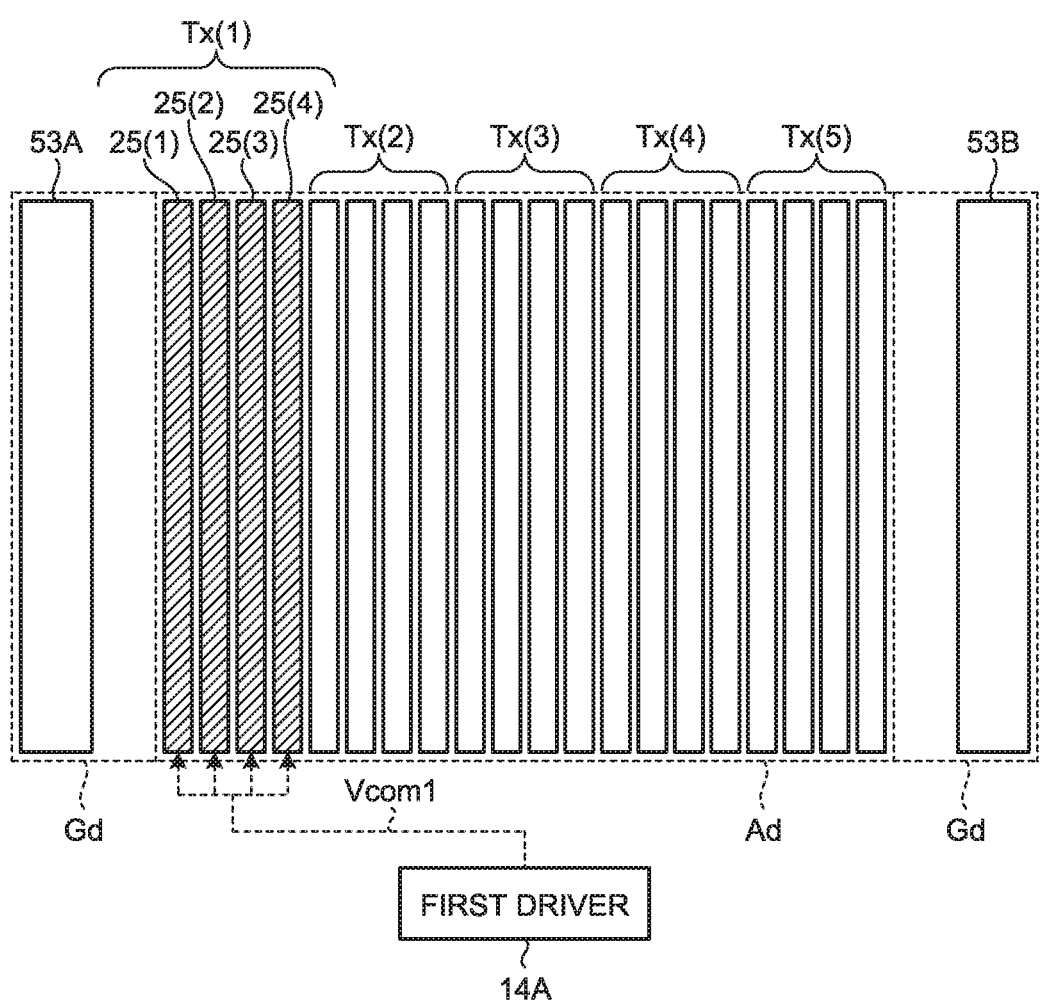
FIG. 14 is a diagram for schematically explaining an exemplary operation in a first detection mode.
Figure 15:
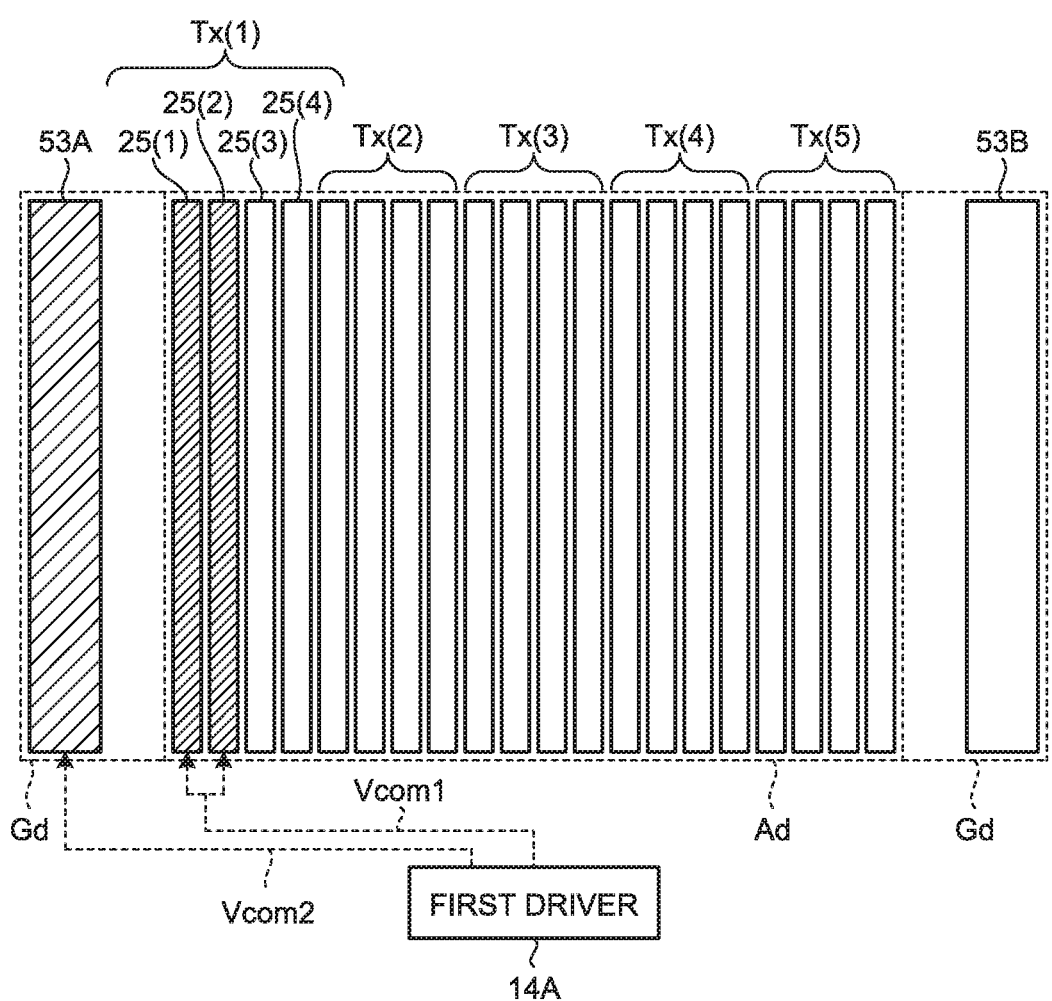
FIG. 15 is a diagram for schematically explaining an exemplary operation in a second detection mode.
Figure 16:
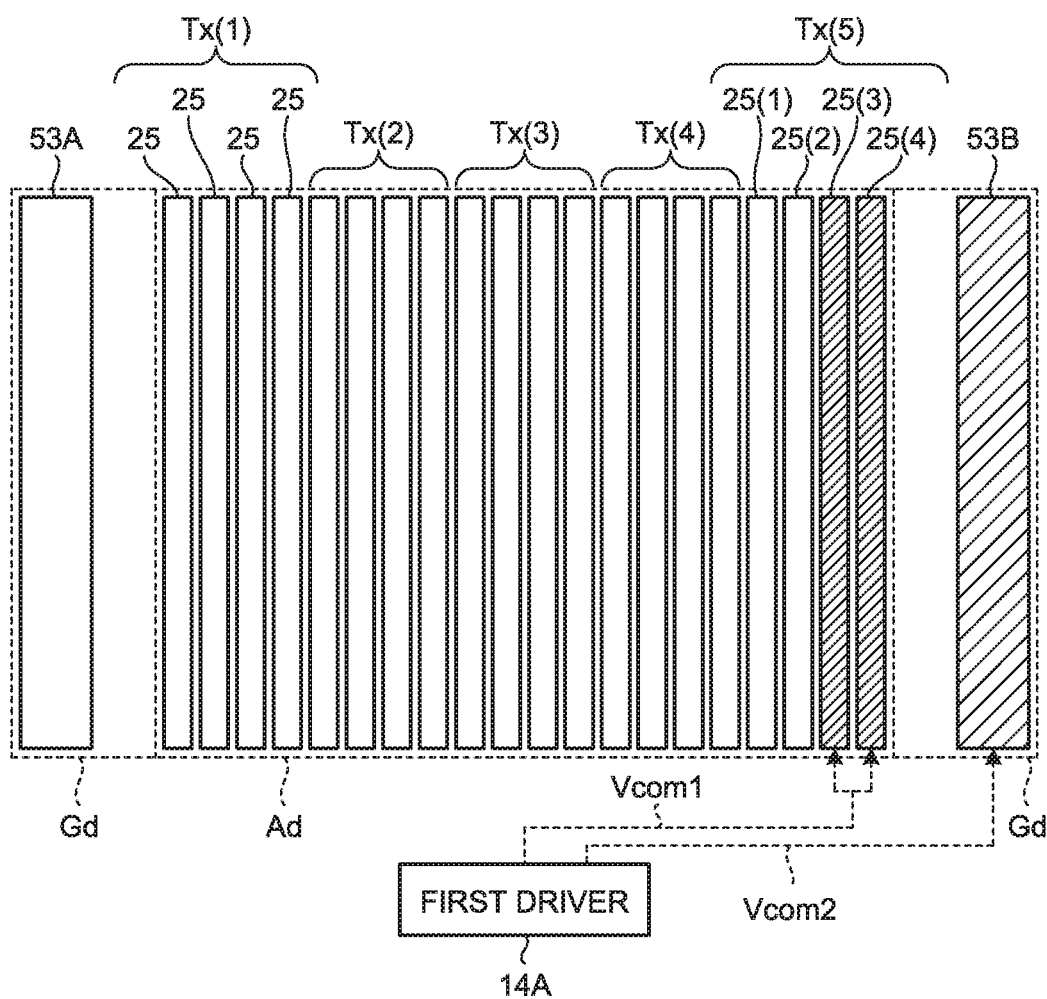
FIG. 16 is a diagram for schematically explaining another exemplary operation in the second detection mode.
Figure 17:
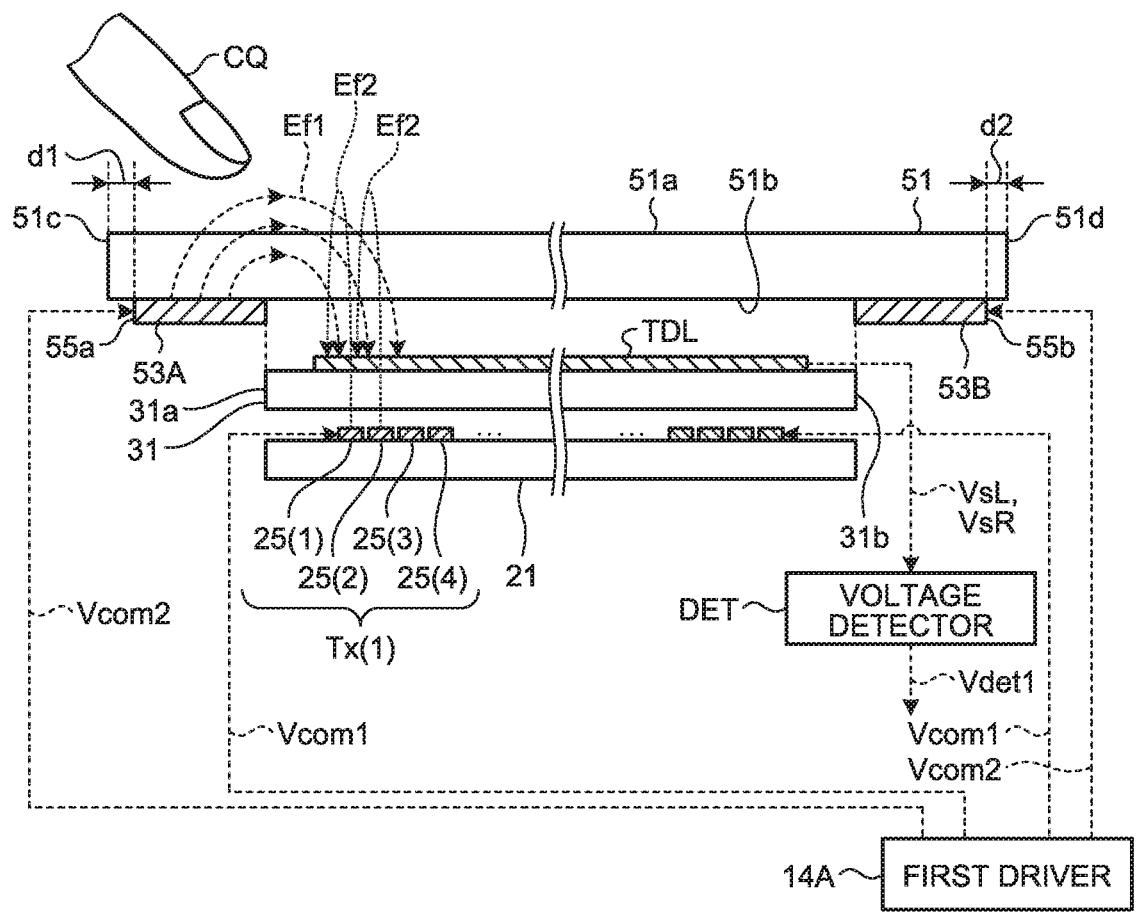
FIG. 17 is a sectional view schematically illustrating the relation between first electrodes, second electrodes, and third electrodes in the second detection mode.

The following describes the detection operation performed by the display device 1 according to the present embodiment in greater detail. FIG. 14 is a diagram for schematically explaining an exemplary operation in a first detection mode. FIG. 15 is a diagram for schematically explaining an exemplary operation in a second detection mode. FIG. 16 is a diagram for schematically explaining another exemplary operation in the second detection mode. FIG. 17 is a sectional view schematically illustrating the relation between the first electrodes, the second electrodes, and the third electrodes in the second detection mode.

The display device 1 according to the present embodiment has three detection modes, that is, a first detection mode, a second detection mode, and a third detection mode. In the first detection mode, the display device 1 mainly detects an object to be detected in the display region Ad by the mutual capacitance method. In the second detection mode, the display device 1 mainly detects an object to be detected in the peripheral region Gd by the mutual capacitance method. In the third detection mode, the display device 1 detects an object to be detected in the display region Ad and the peripheral region Gd by the self-capacitance method.

As illustrated in FIG. 14, drive electrode blocks Tx(1), Tx(2), Tx(3), Tx(4), and Tx(5) each include a plurality of first electrodes 25. In the example illustrated in FIG. 14, the drive electrode blocks Tx(1), Tx(2), Tx(3), Tx(4), and Tx(5) each include four first electrodes 25(1), 25(2), 25(3), and 25(4).

In the following description, the drive electrode blocks Tx(1), Tx(2), Tx(3), Tx(4), and Tx(5) are referred to as the drive electrode blocks Tx when they need not be distinguished from one another. Similarly, the first electrodes 25(1), 25(2), 25(3), and 25(4) are referred to as the first electrodes 25 when they need not be distinguished from one another. While the present embodiment includes five drive electrode blocks Tx to simplify the explanation, it may include six or more drive electrode blocks Tx. The drive electrode blocks Tx may each include five or more first electrodes 25 or two or three first electrodes 25.

In the first detection mode, the scanner 14C (refer to FIG. 12) selects the first electrodes 25(1), 25(2), 25(3), and 25(4) as a target to be driven. The scanner 14C couples the four first electrodes 25 selected as a target to be driven to the first driver 14A. As a result, the four first electrodes 25 are driven as one drive electrode block Tx. As illustrated in FIG. 14, the first driver 14A supplies the drive signals Vcom1 simultaneously to the first electrodes 25(1), 25(2), 25(3), and 25(4) included in the drive electrode block Tx(1). The second electrodes TDL output, to the voltage detector DET, the sensor output signals Vs corresponding to changes in capacitance between the drive electrode block Tx(1) and the second electrodes TDL. The scanner 14C selects the first electrodes 25 in units of the drive electrode block Tx. The first driver 14A sequentially supplies the drive signals Vcom1 to the drive electrode blocks Tx(1), Tx(2), Tx(3), Tx(4), and Tx(5) in a time-division manner. The display device 1 thus can detect an object to be detected in the display region Ad.

As illustrated in FIG. 15, in the second detection mode, the scanner 14C (refer to FIG. 12) selects the third electrode 53A as a target to be driven. Simultaneously, the scanner 14C selects two first electrodes 25(1) and 25(2) out of the first electrodes 25 as a target to be driven. The first driver 14A supplies the drive signals Vcom2 to the third electrode 53A. Simultaneously, the first driver 14A supplies the drive signals Vcom1 to the first electrodes 25(1) and 25(2) of the drive electrode block Tx(1).

The first electrodes 25(1) and 25(2) face the third electrode 53A in planar view and are disposed closer to the third electrode 53A than the other first electrodes 25. No drive signal Vcom1 is supplied to the first electrodes 25(3) and 25(4) of the drive electrode block Tx(1) or the drive electrode blocks Tx(2), Tx(3), Tx(4), and Tx(5). The second electrodes TDL output, to the voltage detector DET, sensor output signals VsL (refer to FIG. 21) corresponding to changes in capacitance between the third electrode 53A and the second electrodes TDL and changes in capacitance between the first electrodes 25 and the second electrodes TDL. The display device 1 thus can perform touch detection in the peripheral region Gd provided with the third electrode 53A.

As illustrated in FIG. 16, in the second detection mode, the scanner 14C (refer to FIG. 12) selects the third electrode 53B and two first electrodes 25(3) and 25(4) facing the third electrode 53B as a target to be driven. The first driver 14A supplies the drive signals Vcom2 to the third electrode 53B. Simultaneously, the first driver 14A supplies the drive signals Vcom1 to the first electrodes 25(3) and 25(4) of the drive electrode block Tx(5).

The first electrodes 25(3) and 25(4) of the drive electrode block Tx(5) face the third electrode 53B in planar view and are disposed closer to the third electrode 53B than the other first electrodes 25. No drive signal Vcom1 is supplied to the drive electrode blocks Tx(1), Tx(2), Tx(3), and Tx(4) or the first electrodes 25(1) and 25(2) of the drive electrode block Tx(5). The second electrodes TDL output, to the voltage detector DET, sensor output signals VsR (refer to FIG. 21) corresponding to changes in capacitance between the third electrode 53B and the second electrodes TDL and changes in capacitance between the first electrodes 25 and the second electrodes TDL. The display device 1 thus can perform touch detection in the peripheral region Gd provided with the third electrode 53B.

The operations in the second detection mode are not limited to the examples illustrated in FIGS. 15 and 16. The display device 1 may drive one first electrode 25 or three or four first electrodes 25 simultaneously with the third electrode 53A or 53B.

As illustrated in FIG. 17, the third electrodes 53A and 53B are disposed on the outer side than the ends of the second electrodes TDL in the extending direction. As illustrated in FIG. 11, the ends of the second electrodes TDL are disposed facing the third electrodes 53A and 53B. With this configuration, capacitance is formed between the third electrodes 53A and 53B and the second electrodes TDL.

As illustrated in FIG. 17, the first driver 14A supplies the drive signals Vcom2 to the third electrodes 53A and 53B. As a result, fringe lines of electric force Ef1 are generated between the third electrodes 53A and 53B and the second electrodes TDL. Simultaneously, the first driver 14A supplies the drive signals Vcom1 to the two first electrodes 25. As a result, fringe lines of electric force Ef2 are generated between the first electrodes 25 and the second electrodes TDL. FIG. 17 illustrates only the lines of electric force Ef1 and Ef2 on the third electrode 53A side.

The lines of electric force Ef1 extend from the third electrode 53A in the peripheral region Gd to the upper side than the first surface 51a of the cover substrate 51 and then extend toward the second electrodes TDL in the display region Ad. The lines of electric force Ef2 extend from the first electrodes 25 disposed near the peripheral region Gd to the upper side than the first surface 51a of the cover substrate 51 and then extend toward the second electrodes TDL in the display region Ad.

As illustrated in FIG. 17, the lines of electric force Ef1 extend from the third electrode 53A in the peripheral region Gd to the second electrodes TDL in the display region Ad. If the third electrode 53A alone is driven, the number of the lines of electric force Ef1 blocked by an object to be detected CQ may possibly be small. This results in a smaller amount of change in capacitance between the third electrode 53A and the second electrodes TDL caused between the contact state and the non-contact state in the peripheral region Gd. Consequently, the display device may possibly fail to provide satisfactory touch detection sensitivity.

The present embodiment drives one or a plurality of first electrodes 25 simultaneously with the third electrode 53A. As a result, the present embodiment has a larger number of the lines of electric force Ef1 and Ef2 extending toward the first surface 51a of the cover substrate 51 near the boundary between the display region Ad and the peripheral region Gd or in the peripheral region Gd. Consequently, the number of the lines of electric force Ef1 and Ef2 blocked by the object to be detected CQ increases compared with a case where the third electrode 53A alone is driven.

The second electrodes TDL output the sensor output signals VsL and VsR to the voltage detector DET. The sensor output signals VsL and VsR in this case correspond to changes in capacitance between the third electrode 53A and the second electrodes TDL and changes in capacitance between the first electrodes 25 and the second electrodes TDL. The signal values of the sensor output signals VsL and VsR increase compared with a case where the third electrode 53A alone is driven, thereby increasing the detection sensitivity. As described above, the present embodiment drives one or a plurality of first electrodes 25 simultaneously with the third electrode 53A, thereby increasing the touch detection sensitivity in the peripheral region Gd.

As illustrated in FIG. 17, the third electrodes 53A and 53B are preferably disposed on the outer side than ends 31a and 31b, respectively, of the second substrate 31 in planar view. This configuration can reduce stray capacitance formed between the various kinds of wiring provided in the peripheral region Gd of the second substrate 31 and the third electrodes 53A and 53B. Consequently, the display device 1 can increase the touch detection sensitivity in the peripheral region Gd.

As illustrated in FIG. 17, an end 55a of the third electrode 53A is preferably disposed near a first end 51c of the cover substrate 51. The end 55a of the third electrode 53A is preferably disposed at a position corresponding to the first end 51c of the cover substrate 51. An end 55b of the third electrode 53B is preferably disposed near a second end 51d of the cover substrate 51. The end 55b of the third electrode 53B is preferably disposed at a position corresponding to the second end 51d of the cover substrate 51.

In a case where the third electrodes 53A and 53B are made of metal, a protective layer covering the third electrodes 53A and 53B may be provided to prevent corrosion, for example. In this case, the third electrodes 53A and 53B fail to reach the ends 51c and 51d, respectively, of the cover substrate 51. A distance d1 is the distance between the end 55a of the third electrode 53A and the end 51c of the cover substrate 51. A distance d2 is the distance between the end 55b of the third electrode 53B and the end 51d of the cover substrate 51. The distances d1 and d2 are preferably 10 µm to 100 µm, for example. With this configuration, the display device 1 can satisfactorily detect an object to be detected near the ends 51c and 51d of the cover substrate 51.

In the third detection mode, the display device 1 detects an object to be detected based on capacitance changes in the first electrodes 25, the second electrodes TDL, and the third electrodes 53A and 53B. The second driver 14B simultaneously or sequentially supplies the drive signals VcomA to the first electrodes 25 and the third electrodes 53A and 53B. The second driver 14B simultaneously or sequentially supplies the drive signals VcomB to the second electrodes TDL. Sensor output signals Vs2 corresponding to capacitance changes in the first electrodes 25, the second electrodes TDL, and the third electrodes 53A and 53B are output to the voltage detector DET.

Figure 18:
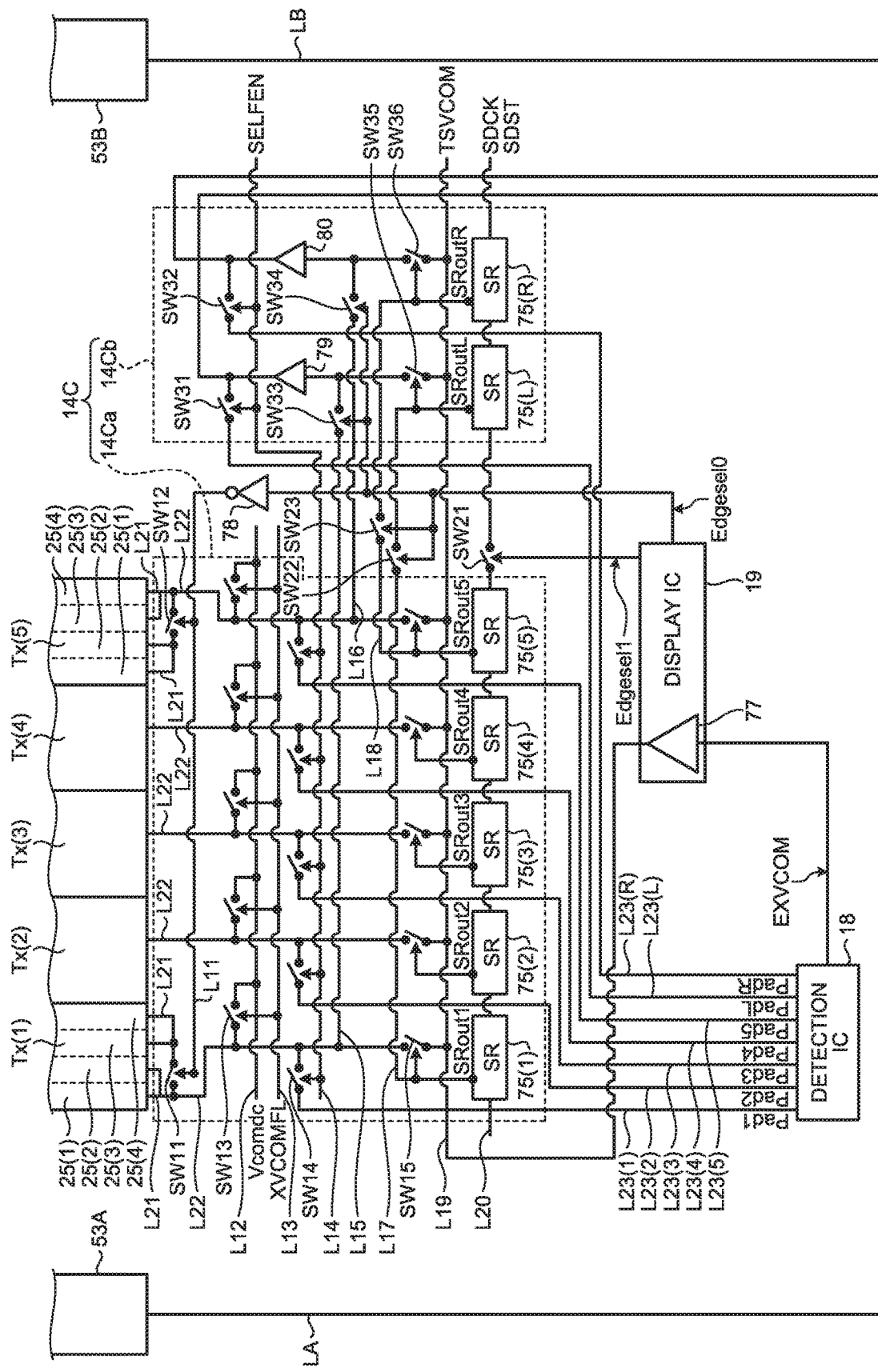
FIG. 18 is a circuit diagram of a drive circuit according to the first embodiment.

The following describes an example of a drive circuit according to the present embodiment. FIG. 18 is a circuit diagram of the drive circuit according to the first embodiment. As illustrated in FIG. 18, the third electrodes 53A and 53B and the drive electrode blocks Tx are coupled to the scanner 14C. The scanner 14C sequentially or simultaneously selects the first electrodes 25 and the third electrodes 53A and 53B to be driven based on the various control signals output from the display IC 19. The first electrodes 25 and the third electrodes 53A and 53B selected as a target to be driven are coupled to the display IC 19 or the detection IC 18 via the scanner 14C. The functions of the first driver 14A (not illustrated in FIG. 18) according to the present embodiment are included in the display IC 19. The functions of the second driver 14B (not illustrated in FIG. 18) are included in the detection IC 18.

The scanner 14C includes a first electrode scanner 14Ca and a third electrode scanner 14Cb. The first electrode scanner 14Ca is a circuit that sequentially scans the drive electrode blocks Tx. The third electrode scanner 14Cb is a circuit that sequentially scans the third electrodes 53A and 53B.

The first electrodes 25 included in the drive electrode block Tx(1) are coupled to respective wires L21. A switch SW11 is provided between the wires L21 coupled to the first electrodes 25(1) and 25(2) and the wires L21 coupled to the first electrodes 25(3) and 25(4). The switch SW11 electrically couples the first electrodes 25 included in the drive electrode block Tx(1). If the switch SW11 is turned on, the four first electrodes 25 included in the drive electrode block Tx(1) are electrically coupled. If the switch SW11 is turned off, the first electrodes 25(1) and 25(2) are electrically decoupled from the first electrodes 25(3) and 25(4) in the drive electrode block Tx(1). Similarly, the drive electrode block Tx(5) is provided with the wires L21 and a switch SW12.

The display IC 19 supplies selection signals Edgesel0 to the switches SW11 and SW12 via an inverter 78 and a wire L11. The selection signal Edgesel0 is a control signal for switching between the first detection mode and the second detection mode. In the second detection mode, the display IC 19 supplies the selection signals Edgesel0 serving as high-level voltage signals to the inverter 78. The inverter 78 inverts the voltage level of the selection signals Edgesel0 to generate low-level voltage signals and supplies them to the switches SW11 and SW12. As a result, the switches SW11 and SW12 are turned off, whereby the first electrodes 25(1) and 25(2) are electrically decoupled from the first electrodes 25(3) and 25(4). By contrast, in the first detection mode, the third detection mode, and the display operation, the display IC 19 supplies the selection signals Edgesel0 at a low voltage level to the inverter 78. As a result, the switches SW11 and SW12 are turned on, and the first electrodes 25(1) and 25(2) are electrically coupled to the first electrodes 25(3) and 25(4).

As illustrated in FIG. 18, wires L22 are coupled to the respective drive electrode blocks Tx. The drive electrode blocks Tx are each coupled to the display IC 19 via the wire L22, a switch SW15, and a wire L19. The drive electrode blocks Tx are each coupled to the detection IC 18 via the wire L22, a switch SW14, and a wire L23.

The third electrode 53A is coupled to the third electrode scanner 14Cb of the scanner 14C via the wire LA. The third electrode 53A is coupled to the display IC 19 via the wire LA, an amplifier 79, a switch SW35, and the wire L19. The third electrode 53A is also coupled to the detection IC 18 via the wire LA, a switch SW31, and a wire L23(L).

Similarly, the third electrode 53B is coupled to the third electrode scanner 14Cb of the scanner 14C via the wire LB. The third electrode 53B is coupled to the display IC 19 via the wire LB, an amplifier 80, a switch SW36, and the wire L19. The third electrode 53B is also coupled to the detection IC 18 via the wire LB, a switch SW32, and a wire L23(R).

The display IC 19 supplies control signals XVCOMFL to switches SW13 via a wire L13. The control signal XVCOMFL is a control signal for switching between the display operation and the detection operation. The control signal XVCOMFL is a high-level voltage signal in the display operation and is a low-level voltage signal in the detection operation. The control signal XVCOMFL is a voltage signal obtained by inverting the voltage level of a control signal VCOMFL (refer to FIG. 19).

In the display operation, the control signal XVCOMFL is at a high level. As a result, the switches SW13 are turned on. The display IC 19 supplies the display drive signals Vcomdc to the drive electrode blocks Tx via a wire L12, the respective switches SW13, and the respective wires L22. In the display operation, the switches SW11 and SW12 are turned on. As a result, the display drive signals Vcomdc are supplied to all the first electrodes 25 included in the drive electrode blocks Tx. Consequently, the first electrodes 25 serve as common electrodes.

The display IC 19 supplies control signals SELFEN to the switches SW14, the switch SW31, and the switch SW32 via a wire L14. Based on the control signals SELFEN, the switches SW14, the switch SW31, and the switch SW32 are turned on and off. The control signal SELFEN is a signal for switching between the mutual capacitance detection mode and the self-capacitance detection mode. In the third detection mode, the control signal SELFEN is a high-level voltage signal. By contrast, in the detection modes other than the third detection mode and in the display operation, the control signal SELFEN is a low-level voltage signal.

In the third detection mode, the control signal SELFEN is at a high level, whereby the switches SW14, the switch SW31, and the switch SW32 are turned on. As a result, the drive electrode blocks Tx are each coupled to the detection IC 18 via the wire L22, the switch SW14, and the wire L23. Wires L23(1), L23(2), L23(3), L23(4), and L23(5) are coupled to output terminals Pad1, Pad2, Pad3, Pad4, and Pad5, respectively, of the detection IC 18. The second driver 14B (not illustrated) included in the detection IC 18 supplies the drive signals VcomA to the drive electrode blocks Tx simultaneously or in a time-division manner. The sensor output signals Vs2 corresponding to capacitance changes in the first electrodes 25 are supplied to the voltage detector DET of the detection IC 18. The display device 1 thus performs the self-capacitance touch detection described above.

The third electrode 53A is coupled to the detection IC 18 via the wire LA, the switch SW31, and the wire L23(L). The wire L23(L) is coupled to an output terminal PadL of the detection IC 18. Similarly, the third electrode 53B is coupled to the detection IC 18 via the wire LB, the switch SW32, and the wire L23(R). The wire L23(R) is coupled to an output terminal PadR of the detection IC 18. The second driver 14B (not illustrated) supplies the drive signals VcomA to the third electrodes 53A and 53B simultaneously or in a time-division manner. The sensor output signals Vs2 corresponding to capacitance changes in the third electrodes 53A and 53B are supplied to the voltage detector DET of the detection IC 18. The display device 1 thus performs the self-capacitance touch detection described above.

If the control signal SELFEN is a low-level voltage signal, the switches SW14, the switch SW31, and the switch SW32 are turned off. As a result, the drive electrode blocks Tx and the third electrodes 53A and 53B are not electrically coupled to the detection IC 18.

In the first detection mode and the second detection mode, the first electrode scanner 14Ca and the third electrode scanner 14Cb select the drive electrode blocks Tx and the third electrodes 53A and 53B to be driven based on the control signals from the display IC 19. Specifically, the first electrode scanner 14Ca includes shift registers 75(1), 75(2), 75(3), 75(4), and 75(5). The shift registers 75(1), 75(2), 75(3), 75(4), and 75(5) are provided corresponding to the drive electrode blocks Tx(1), Tx(2), Tx(3), Tx(4), and Tx(5), respectively. The third electrode scanner 14Cb includes shift registers 75(L) and 75(R). The shift registers 75(L) and 75(R) are provided corresponding to the third electrodes 53A and 53B, respectively.

In the following description, the shift registers 75(1), 75(2), 75(3), 75(4), 75(5), 75(L), and 75(R) are referred to as the shift registers 75 when they need not be distinguished from one another.

As illustrated in FIG. 18, the shift registers 75 are disposed in the order of the shift registers 75(1), 75(2), 75(3), 75(4), 75(5), 75(L), and 75(R). A switch SW21 is provided between the shift register 75(5) and the shift register 75(L). The switch SW21 is turned on and off based on selection signals Edgesel1 supplied from the display IC 19. The selection signal Edgesel1 according to the present embodiment is a voltage signal fixed at a high level. As a result, the shift registers 75 of the first electrode scanner 14Ca and the shift registers 75 of the third electrode scanner 14Cb are electrically coupled in series. With this configuration, the shift registers 75 can sequentially supply scanning signals SRout to the drive electrode blocks Tx and the third electrodes 53A and 53B.

Specifically, the display IC 19 supplies scanning start signals SDST and clock signals SDCK to the shift registers 75 via a wire L20. The shift registers 75 start scanning using the scanning start signals SDST as a trigger. The shift registers 75 sequentially output scanning signals SRout1, SRout2, SRout3, SRout4, SRout5, SRoutL, and SRoutR synchronized with the clock signals SDCK to the switches SW15, SW35, and SW36.

In the first detection mode, the shift registers 75 sequentially supply the scanning signals SRout1, SRout2, SRout3, SRout4, and SRout5 to the respective switches SW15. The switch SW15 is provided between the wire L22 and the wire L19. If the switch SW15 receives the scanning signal SRout and is turned on, the drive electrode block Tx to be driven is electrically coupled to the display IC 19 via the wire L22, the switch SW15, and the wire L19. As a result, the drive electrode block Tx to be driven is selected by the corresponding shift register 75. As described above, the scanner 14C selects the first electrodes 25 in units of the drive electrode block Tx. The display IC 19 sequentially supplies drive signals TSVCOM to the drive electrode blocks Tx to be driven. The display device 1 thus performs touch detection in the display region Ad by the mutual capacitance method.

The detection IC 18 supplies input logic signals EXV-COM to the display IC 19. An amplifier 77 included in the display IC 19 amplifies the input logic signals EXVCOM. The display IC 19 supplies the signals resulting from amplification to the drive electrode block Tx to be driven as the drive signals TSVCOM. The drive signal TSVCOM corresponds to the drive signal Vcom1 (refer to FIGS. 1 and 17). The method for generating the drive signals TSVCOM is not limited thereto, and they may be generated in any desired method. The drive signals TSVCOM, for example, may be generated by alternately switching between a high-level DC voltage signal and a low-level DC voltage signal.

In the second detection mode, the shift registers 75(L) and 75(R) sequentially supply the scanning signals SRoutL and SRoutR to the switches SW35 and SW36, respectively. The switch SW35 is provided between the wire LA and the wire L19. If the switch SW35 is turned on, the third electrode 53A to be driven is electrically coupled to the display IC 19. The display IC 19 supplies the drive signals TSVCOM to the amplifier 79 via the wire L19 and the switch SW35.

The drive signals Vcom2 resulting from amplification performed by the amplifier 79 are supplied to the third electrode 53A via the wire LA. The display device 1 thus performs touch detection in the peripheral region Gd by the mutual capacitance method.

Similarly, the switch SW36 is provided between the wire LB and the wire L19. If the switch SW36 is turned on, the third electrode 53B to be driven is electrically coupled to the display IC 19. The display IC 19 supplies the drive signals TSVCOM to the amplifier 80 via the wire L19 and the switch SW36. The drive signals Vcom2 resulting from amplification performed by the amplifier 80 are supplied to the third electrode 53B via the wire LB. The display device 1 thus performs touch detection in the peripheral region Gd by the mutual capacitance method.

The shift register 75(L) according to the present embodiment can be coupled to the shift register 75(1) via a switch SW22 and a wire L17. The shift register 75(R) can be coupled to the shift register 75(5) via a switch SW23 and a wire L18.

In the second detection mode, the display IC 19 supplies the selection signals Edgesel0 to the switches SW22 and SW23. The selection signal Edgesel0 is a high-level voltage signal. As a result, the switches SW22 and SW23 are turned on, whereby the shift register 75(L) is coupled to the shift register 75(1).

Simultaneously, the display IC 19 supplies the selection signals Edgesel0 to switches SW33 and SW34. If the switch SW33 is turned on, the drive electrode block Tx(1) is electrically coupled to the third electrode 53A via the wire L22, a wire L15, the switch SW33, and the wire LA. If the switch SW34 is turned on, the drive electrode block Tx(5) is electrically coupled to the third electrode 53B via the wire L22, a wire L16, the switch SW34, and the wire LB.

The shift register 75(L) supplies the scanning signals SRoutL to the switch SW15 via the wire L17. As a result, the shift register 75(L) supplies the same scanning signals SRoutL to the third electrode 53A and the first electrodes 25(1) and 25(2) to be driven. As described above, in the second detection mode, the switches SW11 and SW12 coupled to the drive electrode blocks Tx(1) and Tx(5), respectively, are turned off. As a result, the first electrodes 25(1) and 25(2) of the drive electrode block Tx(1) are coupled to the display IC 19 via the wire L22, the switch SW15, and the wire L19. The first electrodes 25(1) and 25(2) are selected as a target to be driven simultaneously with the third electrode 53A. The display IC 19 supplies the drive signals TSVCOM to the third electrode 53A and the first electrodes 25(1) and 25(2) to be driven.

Similarly, the shift register 75(R) supplies the scanning signals SRoutR to the switch SW15 via the wire L18. As a result, the first electrodes 25(3) and 25(4) of the drive electrode block Tx(5) are coupled to the display IC 19 via the wire L22, the switch SW15, and the wire L19. The first electrodes 25(3) and 25(4) are selected as a target to be driven simultaneously with the third electrode 53B. The display IC 19 supplies the drive signals TSVCOM to the third electrode 53B and the first electrodes 25(3) and 25(4) to be driven.

With this configuration, the scanner 14C simultaneously selects the third electrodes 53A and 53B and at least one first electrode 25 facing the third electrodes 53A and 53B in planar view as a target to be driven. The third electrodes 53A and 53B and the first electrode 25 to be driven are simultaneously driven. Consequently, the display device 1 can increase the touch detection sensitivity in the peripheral region Gd. The third electrodes 53A and 53B according to the present embodiment are supplied with the drive signals Vcom2 resulting from amplification performed by the amplifiers 79 and 80, respectively. Consequently, the display device 1 can further increase the touch detection sensitivity in the peripheral region Gd.

The shift registers 75(L) and 75(R) according to the present embodiment can be coupled to or decoupled from the shift registers 75(1), 75(2), 75(3), 75(4), and 75(5) by the switches SW21, SW22, and SW23. With this configuration, the first electrode scanner 14Ca can be provided without significantly changing a drive circuit having the conventional configuration that drives the drive electrode blocks Tx in a time-division manner. If touch detection is not performed in the peripheral region Gd, the display IC 19 can change the drive of the scanner 14C by supplying the selection signals Edgesel0 and Edgesel1 to the switches SW21, SW22, and SW23.

The circuit configuration illustrated in FIG. 18 is given by way of example only and may be appropriately modified. The shift registers 75, for example, may be disposed in the order of the shift registers 75(L), 75(R), 75(1), 75(2), 75(3), 75(4), and 75(5). In the example illustrated in FIG. 18, two first electrodes 25 are selected simultaneously with the third electrodes 53A and 53B as drive electrodes. The configuration is not limited thereto, and one or three or more first electrodes 25 may be selected simultaneously with the third electrodes 53A and 53B. In this case, the number of first electrodes 25 coupled to one end of the switches SW11 and SW12 is one or three or more.

Figure 19:
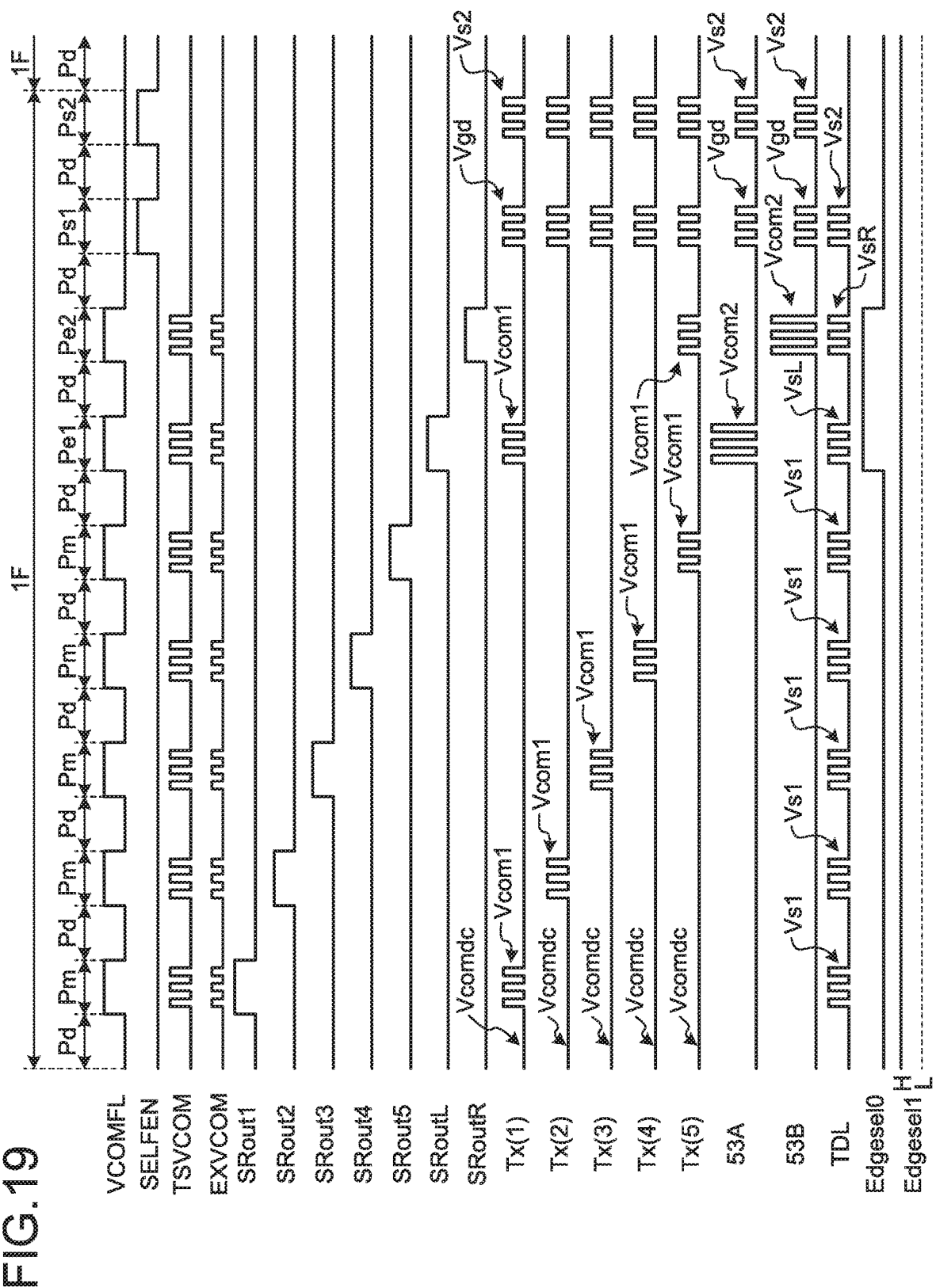
FIG. 19 is a timing waveform chart of an exemplary operation performed by the display device according to the first embodiment.

The following describes an example of the operation performed by the display device 1 according to the present embodiment. FIG. 19 is a timing waveform chart of an exemplary operation performed by the display device according to the first embodiment.

The display device 1 performs a touch detection operation (detection period) and a display operation (display period) in a time-division manner. The display device 1 may perform the touch detection operation and the display operation in any division manner. The following describes a method of performing touch detection and display in a time-division manner in one frame period 1F of the display panel 10, that is, in a time required to display video information of one screen, for example.

As illustrated in FIG. 19, a plurality of display periods Pd and a plurality of detection periods Pm, Pe1, Pe2, Ps1, and Ps2 are alternately arranged. The display periods Pd and the detection periods Pm, Pe1, Pe2, Ps1, and Ps2 are switched based on the control signals VCOMFL and SELFEN supplied from the controller 11 (refer to FIG. 1).

If the control signal VCOMFL is at a low-level, the display operation is performed in the display period Pd. In the display period Pd, the controller 11 outputs the control signals to the gate driver 12 and the source driver 13 (refer to FIG. 1). The gate driver 12 applies the scanning signals Vscan to the switching elements Tr via the gate lines GCL. The source driver 13 supplies the pixel signals Vpix to the pixels Pix via the signal lines SGL. The display device 1 thus performs the image display operation.

The first electrodes 25 of the drive electrode blocks Tx according to the present embodiment also serve as the common electrodes of the display panel 10. As illustrated in FIG. 19, the first driver 14A included in the display IC 19 supplies the drive signals Vcomdc serving as a common potential for display drive to all the drive electrode blocks Tx in the display region Ad in the display period Pd. The second electrodes TDL are supplied with no voltage signal, thereby being brought into a floating state where their electric potential is not fixed.

In the detection periods Pm, Pe1, and Pe2, the control signal VCOMFL is at a high level, whereby the detection operations in the first detection mode and the second detection mode are performed. The first detection mode and the second detection mode are switched based on the selection signal Edgesel0.

In the detection period Pm, the display IC 19 brings the control signal VCOMFL to a high level and brings the selection signal Edgesel0 to a low level. In this case, the display device 1 detects an object to be detected in the display region Ad by performing touch detection in the first detection mode. In the detection periods Pe1 and Pe2, the display IC 19 brings the control signal VCOMFL to a high level and brings the selection signal Edgesel0 to a high level. In this case, the display device 1 detects an object to be detected in the peripheral region Gd by performing touch detection in the second detection mode.

The selection signal Edgesel1 is fixed at a high level H in one frame period 1F. As a result, the shift registers 75 of the first electrode scanner 14Ca illustrated in FIG. 18 are electrically coupled to the shift registers 75 of the third electrode scanner 14Cb in series. This configuration can facilitate the detection operations performed in the detection periods Pm, Pe1, and Pe2 in one frame period 1F.

In the detection periods Ps1 and Ps2, the control signal SELFEN is at a high level. In this case, the display device 1 performs the detection operation in the third detection mode. As illustrated in FIG. 19, the detection periods are arranged in the order of Pm, Pe1, Pe2, Ps1, and Ps2 in one frame period 1F. The display device 1 performs the detection operations in the order of the first direction mode, the second direction mode, and the third detection mode.

In the first detection mode, the scanner 14C (refer to FIG. 18) selects one drive electrode block Tx as a target to be driven in each detection period Pm. Specifically, the scanner 14C sequentially outputs the scanning signals SRout1, SRout2, SRout3, SRout4, and SRout5, thereby selecting the drive electrode blocks Tx to be driven. The detection IC 18 supplies the input logic signals EXVCOM to the display IC 19. The display IC 19 generates the drive signals TSVCOM based on the input logic signals EXVCOM. The display IC 19 sequentially supplies the drive signals TSVCOM (drive signals Vcom1) to the drive electrode blocks Tx(1), Tx(2), Tx(3), Tx(4), and Tx(5) to be driven. The second electrodes TDL output, to the voltage detector DET (refer to FIG. 3), the sensor output signals Vs1 corresponding to changes in capacitance between the drive electrode blocks Tx and the second electrodes TDL. The display device 1 thus detects a touch made by an object to be detected in the display region Ad.

In the second detection mode, the scanner 14C (refer to FIG. 18) outputs the scanning signal SRoutL in the detection period Pe1. As a result, the third electrode 53A and one or a plurality of first electrodes 25 included in the drive electrode block Tx(1) to be driven are selected. The display IC 19 supplies the drive signals TSVCOM serving as the drive signals Vcom1 to the drive electrode block Tx(1) to be driven. Simultaneously, the drive signals Vcom2 are supplied to the third electrode 53A to be driven. The drive signal Vcom2 is a voltage signal obtained by amplifying the drive signal TSVCOM and has an amplitude of substantially three times the amplitude of the drive signal Vcom1, for example.

The second electrodes TDL output, to the voltage detector DET (refer to FIG. 3), the sensor output signals VsL corresponding to changes in capacitance between the second electrodes TDL and the third electrode 53A and changes in capacitance between the second electrodes TDL and the drive electrode block Tx. The display device 1 thus detects a touch made by an object to be detected in the peripheral region Gd.

Similarly, the scanner 14C outputs the scanning signal SRoutR in the detection period Pe2. As a result, the third electrode 53B and one or a plurality of first electrodes 25 included in the drive electrode block Tx(5) to be driven are selected. The display IC 19 supplies the drive signals TSVCOM serving as the drive signals Vcom1 to the drive electrode block Tx(5) to be driven. Simultaneously, the drive signals Vcom2 are supplied to the third electrode 53B to be driven.

The second electrodes TDL output, to the voltage detector DET (refer to FIG. 3), the sensor output signals VsR corresponding to changes in capacitance between the second electrodes TDL and the third electrode 53B and changes in capacitance between the second electrodes TDL and the drive electrode block Tx. The display device 1 thus detects a touch made by an object to be detected in the peripheral region Gd.

In the detection periods Ps1 and Ps2, the detection controller 11A (refer to FIG. 1) included in the detection IC 18 mainly performs self-capacitance touch detection. In the detection period Ps1, the detection IC 18 supplies the drive signals VcomA to the second electrodes TDL. The second electrodes TDL output the sensor output signals Vs2 corresponding to capacitance changes in the second electrodes TDL to the voltage detector DET. In the detection period Ps1, the display device 1 calculates the position of an object to be detected in the array direction of the second electrodes TDL, that is, in the second direction Dy (refer to FIG. 11).

In the detection period Ps1, the detection IC 18 supplies the guard signals Vgd to the first electrodes 25 included in all the drive electrode blocks Tx and the third electrodes 53A and 53B. The guard signal Vgd is a voltage signal synchronized with the drive signal VcomA and having the same electric potential as that of the drive signal VcomA. As a result, the first electrodes 25 and the third electrodes 53A and 53B are driven at the same electric potential as that of the second electrodes TDL. This mechanism can reduce stray capacitance generated between the switching elements Tr and the various kinds of wiring provided to the first substrate 21 and the second electrodes TDL.

In the detection period Ps2, the detection IC 18 supplies the drive signals VcomB to the first electrodes 25 included in the drive electrode blocks Tx and the third electrodes 53A and 53B. The first electrodes 25 output the sensor output signals Vs2 corresponding to capacitance changes in the first electrodes 25 to the voltage detector DET. The third electrodes 53A and 53B output the sensor output signals Vs2 corresponding to capacitance changes in the third electrodes 53A and 53B to the voltage detector DET. In the detection period Ps2, the display device 1 calculates the position of an object to be detected in the array direction of the first electrodes 25 and the third electrodes 53A and 53B, that is, in the first direction Dx (refer to FIG. 11). As described above, the first electrodes 25 and the third electrodes 53A and 53B serve as detection electrodes in self-capacitance touch detection.

In the detection period Ps2, the detection IC 18 may supply the guard signals Vgd to the third electrodes 53A and 53B. The guard signal Vgd is a voltage signal synchronized with the drive signal VcomB and having the same electric potential as that of the drive signal VcomB. As a result, the third electrodes 53A and 53B are driven at the same electric potential as that of the first electrodes 25. In this case, the first electrodes 25 serve as detection electrodes, and the third electrodes 53A and 53B serve as guard electrodes. This mechanism can reduce stray capacitance in the first electrodes 25. The detection IC 18 may supply no voltage signal to the second electrodes TDL, thereby bringing them into a floating state. Alternatively, the detection IC 18 may supply voltage signals having a fixed potential to the second electrodes TDL.

The exemplary operation illustrated in FIG. 19 is given by way of example only and may be appropriately modified. The lengths (widths) of the display period Pd and the detection periods Pm, Pe1, Pe2, Ps1, and Ps2, for example, are schematic ones and may be equal to or different from one another. The order of the detection periods Pm, Pe1, Pe2, Ps1, and Ps2 may be appropriately modified. While the display device 1 performs the detection operation for one detection surface in one frame period 1F, it may perform the detection operation for one detection surface during a plurality of frame periods 1F.

Figure 20:
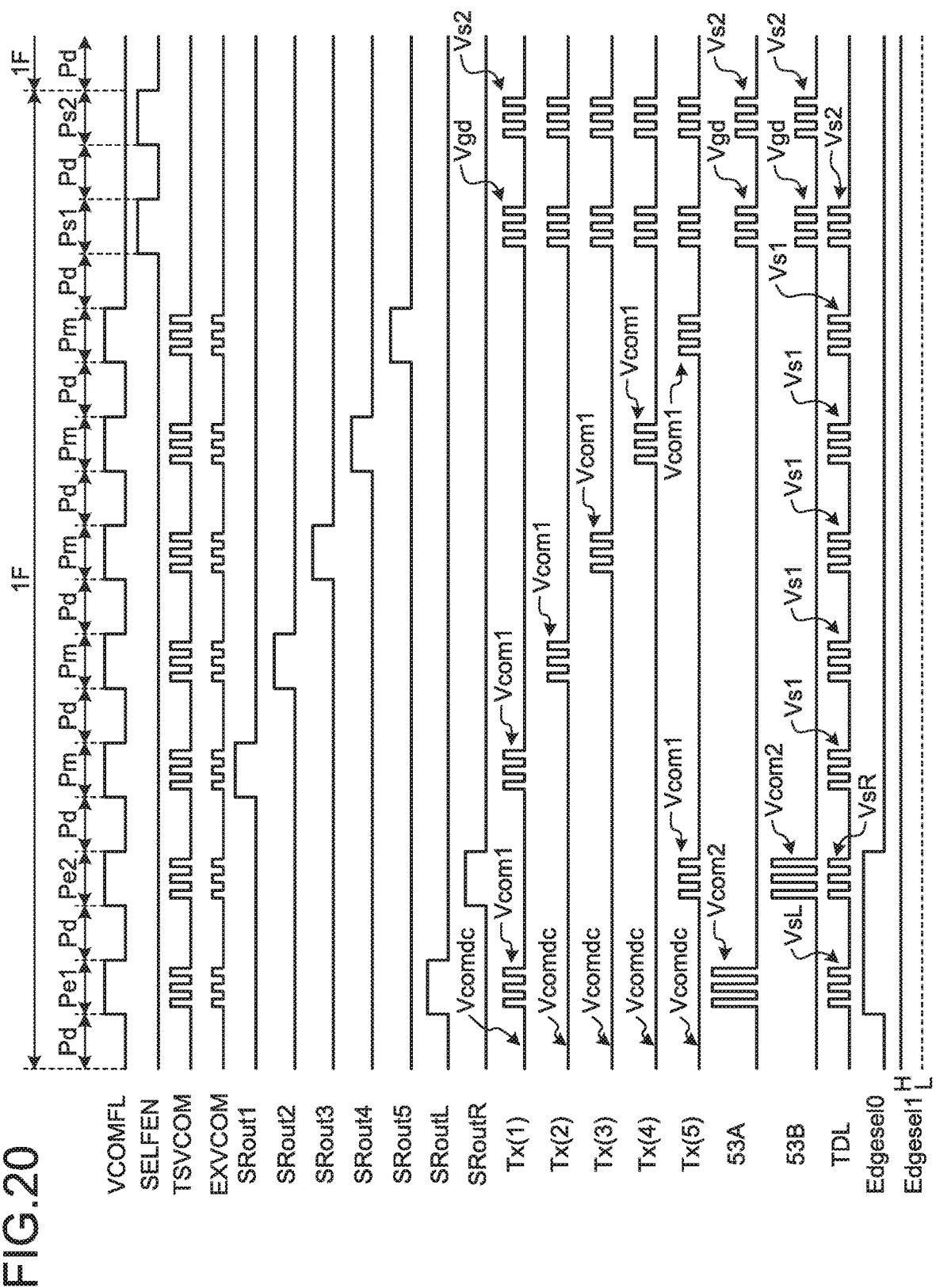
FIG. 20 is a timing waveform chart of another exemplary operation performed by the display device according to the first embodiment.

FIG. 20 is a timing waveform chart of another exemplary operation performed by the display device according to the first embodiment. As illustrated in FIG. 20, the detection periods Pm are arranged after the detection periods Pe1 and Pe2 in the present modification. In other words, the display device 1 performs the detection operation in the first detection mode after the detection operation in the second detection mode.

Specifically, the shift registers 75(L) and 75(R) illustrated in FIG. 18 are disposed before the shift registers 75(1), 75(2), 75(3), 75(4), and 75(5) in the present modification. The shift registers 75 output the scanning signals SRoutL, SRoutR, SRout1, SRout2, SRout3, SRout4, and SRout5 in this order. As a result, the third electrodes 53A and 53B and the drive electrode blocks Tx to be driven are selected.

Figure 21:
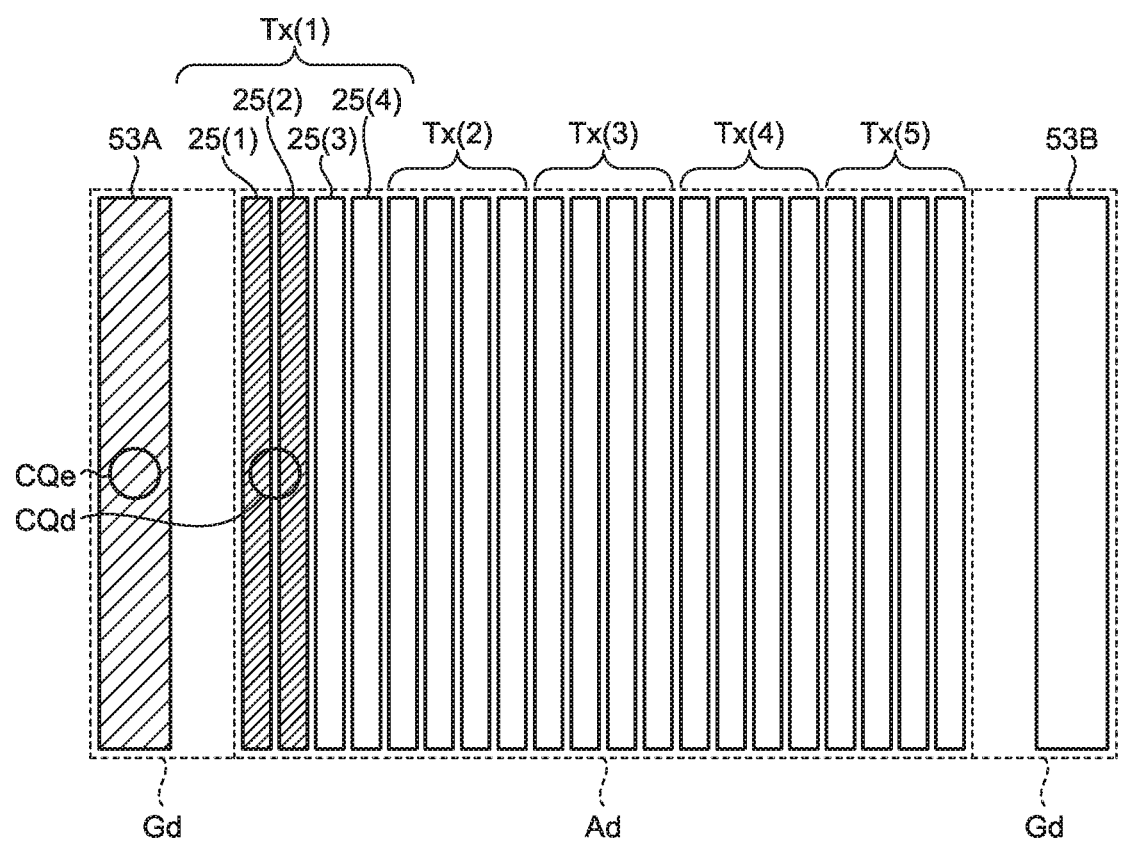
FIG. 21 is a diagram for explaining the positions of objects to be detected in the second detection mode.
Figure 22:
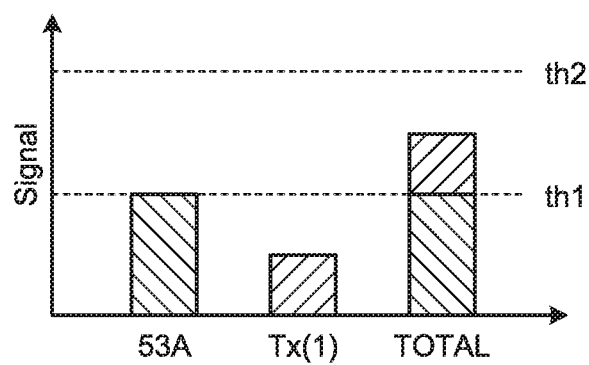
FIG. 22 is a graph schematically illustrating the relation between the first electrodes, the third electrode, and sensor output signals obtained when an object to be detected is in contact with or in proximity to a peripheral region.
Figure 23:
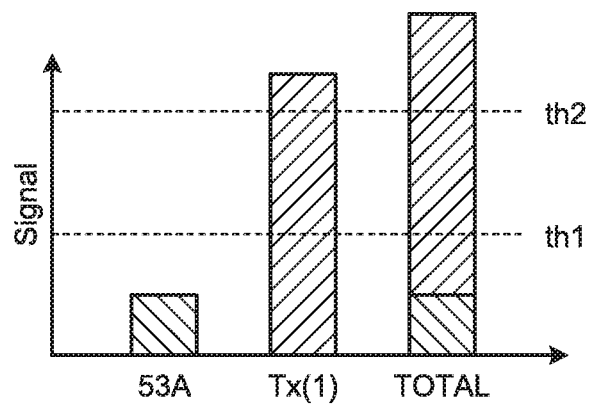
FIG. 23 is a graph schematically illustrating the relation between the first electrodes, the third electrode, and the sensor output signals obtained when an object to be detected is in contact with or in proximity to a display region.

The following describes the relation between the position of an object to be detected and the sensor output signals in the second detection mode. FIG. 21 is a diagram for explaining the positions of objects to be detected in the second detection mode. FIG. 22 is a graph schematically illustrating the relation between the first electrodes, the third electrode, and the sensor output signals obtained when an object to be detected is in contact with or in proximity to the peripheral region. FIG. 23 is a graph schematically illustrating the relation between the first electrodes, the third electrode, and the sensor output signals obtained when an object to be detected is in contact with or in proximity to the display region.

FIG. 21 schematically illustrates a case where the third electrode 53A and the first electrodes 25(1) and 25(2) of the drive electrode block Tx(1) are simultaneously driven. As illustrated in FIG. 21, the first electrodes 25(1) and 25(2) provided in the display region Ad are driven simultaneously with the third electrode 53A provided in the peripheral region Gd in the second detection mode. As a result, the display device 1 may possibly detect an object to be detected CQd at a position overlapping the first electrodes 25(1) and 25(2) in the display region Ad.

The graphs illustrated in FIGS. 22 and 23 each indicate a signal value (Signal) of the sensor output signal obtained when only the third electrode 53A is driven, a signal value obtained when only the first electrodes 25(1) and 25(2) of the drive electrode block Tx(1) are driven, and a signal value obtained when the third electrode 53A and the drive electrode block Tx(1) are simultaneously driven.

FIG. 22 illustrates the signal values obtained when an object to be detected CQe (refer to FIG. 21) is in contact with or in proximity to the peripheral region Gd. As illustrated in FIG. 22, the signal value corresponding to capacitance changes in the third electrode 53A is larger than the signal value corresponding to capacitance changes in the drive electrode block Tx(1). The signal value obtained when the third electrode 53A and the drive electrode block Tx(1) are simultaneously driven is a first threshold th1 to a second threshold th2.

FIG. 23 illustrates the signal values obtained when the object to be detected CQd (refer to FIG. 21) is in contact with or in proximity to the display region Ad. As illustrated in FIG. 23, the signal value corresponding to capacitance changes in the third electrode 53A is smaller than the signal value corresponding to capacitance changes in the drive electrode block Tx(1). The signal value corresponding to capacitance changes in the drive electrode block Tx(1) is equal to or larger than the second threshold th2. The signal value obtained when the third electrode 53A and the drive electrode block Tx(1) are simultaneously driven is equal to or larger than the second threshold th2.

As described above, if the signal value is smaller than the first threshold th1, the display device 1 determines that the object to be detected CQe is in the non-contact state in the peripheral region Gd. If the signal value is the first threshold th1 to the second threshold th2, the display device 1 determines that the object to be detected CQe is in the contact state in the peripheral region Gd. If the signal value is larger than the second threshold th2, the display device 1 determines that the object to be detected CQd is in the contact state in the display region Ad and not in contact with the peripheral region Gd. As described above, if the third electrode 53A and the drive electrode block Tx(1) are simultaneously driven, the display device 1 can determine whether an object to be detected is the object to be detected CQd in the display region Ad or the object to be detected CQe in the peripheral region Gd, or an object to be detected is in the non-contact state.

Figure 24:
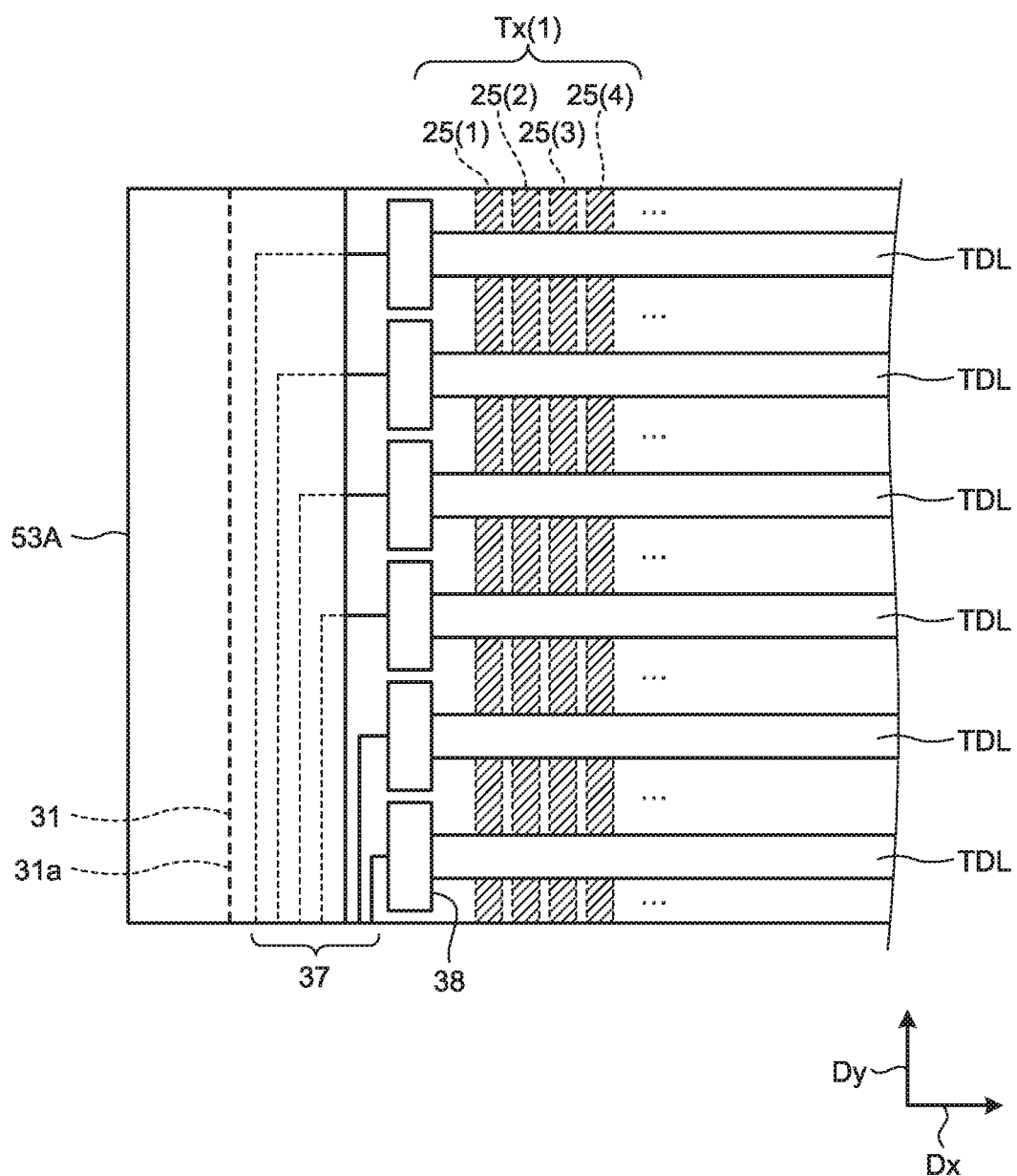
FIG. 24 is an enlarged plan view schematically illustrating the relation between the second electrodes and the third electrode.

FIG. 24 is an enlarged plan view schematically illustrating the relation between the second electrodes and the third electrode. As illustrated in FIG. 24, pads 38 are provided to ends of the respective second electrodes TDL. The ends of the second electrodes TDL are disposed on the outer side than the first electrode 25(1) of the drive electrode block Tx(1). Coupling wires 37 are coupled to the respective pads 38 and extend in the second direction Dy. The coupling wires 37 are coupled to the flexible substrate 71 (refer to FIG. 12) and electrically coupled to the detection IC 18. The third electrode 53A is disposed on the outer side than the ends of the second electrodes TDL at a position not overlapping the second electrodes TDL. The third electrode 53A may overlap part of the coupling wires 37. Similarly, the third electrode 53B, which is not illustrated in FIG. 24, may overlap part of the coupling wires 37. With this configuration, the width of the peripheral region Gd of the cover substrate 51 can be reduced.

Second Embodiment

Figure 25:
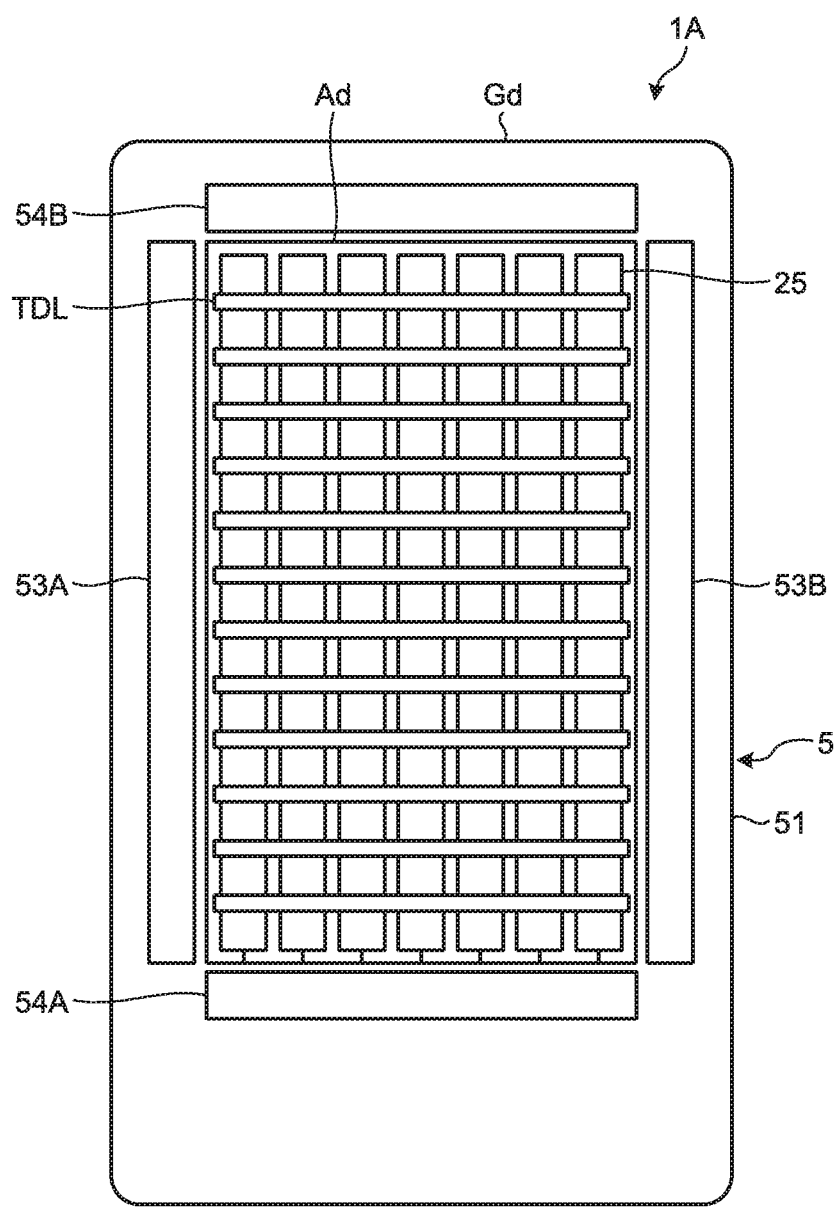
FIG. 25 is a plan view schematically illustrating the display device according to a second embodiment of the present disclosure.

FIG. 25 is a plan view schematically illustrating the display device according to a second embodiment of the present disclosure. As illustrated in FIG. 25, a display device 1A according to the present embodiment includes third electrodes 54A and 54B besides the third electrodes 53A and 53B in the peripheral region Gd. The third electrodes 54A and 54B are provided on the second surface 51b of the cover substrate 51.

The third electrode 54A is disposed on one of the sides of the peripheral region Gd facing each other in the second direction Dy, and the third electrode 54B is disposed on the other thereof. The third electrodes 54A and 54B extend in the first direction Dx and are disposed facing each other in the second direction Dy. The third electrodes 53A, 53B, 54A, and 54B are disposed surrounding the first electrodes 25 and the second electrodes TDL in the respective areas along the four sides of the peripheral region Gd in planar view. The third electrodes 54A and 54B extend in a direction parallel to the second electrodes TDL and are disposed facing the ends of the first electrodes 25 in planar view.

The third electrodes 54A and 54B extend in a direction along the short sides of the display region Ad. The third electrodes 54A and 54B are each disposed with a space interposed between the ends of the third electrodes 53A and 53B and those of the third electrodes 54A and 54B. The length of the third electrodes 54A and 54B in the first direction Dx is preferably substantially equal to or longer than that of the display region Ad in the first direction Dx. The length of the third electrodes 54A and 54B in the first direction Dx may be shorter than that of the display region Ad in the first direction Dx. The third electrodes 54A and 54B each preferably continuously extend without being electrically separated in a portion along at least one side of the display region Ad.

The first driver 14A (refer to FIG. 1) according to the present embodiment supplies the drive signals Vcom1 to the first electrodes 25. As a result, fringe lines of electric force are generated between the first electrodes 25 and the third electrodes 54A and 54B. If an object to be detected is in contact with or in proximity to the first surface 51a of the cover substrate 51 in the peripheral region Gd, the fringe lines of electric force formed between the first electrodes 25 and the third electrodes 54A and 54B are blocked. The third electrodes 54A and 54B output, to the voltage detector DET, the sensor output signals corresponding to changes in capacitance between the third electrodes 54A and 54B and the first electrodes 25. The voltage detector DET outputs the detection signals Vdet1 based on the basic principle of mutual capacitance touch detection described above.

As described above, the third electrodes 54A and 54B serve as detection electrodes in touch detection. With this configuration, the display device 1 can detect an object to be detected in the peripheral region Gd not provided with the third electrode 53A or 53B. As described above, the third electrodes 54A and 54B can expand the detection range in the second direction Dy to the outer side than the display region Ad.

While exemplary embodiments according to the present disclosure have been described, the embodiments are not intended to limit the disclosure. The contents disclosed in the embodiments are given by way of example only, and various modifications may be made without departing from the spirit of the present disclosure. Appropriate modifications made without departing from the spirit of the present disclosure naturally fall within the technical scope of the disclosure.

The display device according to the present aspect may have the following aspects, for example.

(1) A display device comprising:
a first substrate;
a plurality of first electrodes disposed in a display region of the first substrate;
a second electrode facing the first electrodes in a direction perpendicular to a surface of the first substrate and configured to form capacitance between the second electrode and the first electrodes;
a third electrode provided in a peripheral region positioned on the outside of the display region and not overlapping the first electrodes in planar view; and
a driver configured to supply a drive signal to the third electrode and at least one first electrode out of the first electrodes simultaneously.

(2) The display device according to (1), wherein the one first electrode is disposed closer to the third electrode than the other first electrodes.

(3) The display device according to (1), further comprising a scanner configured to select the first electrode to be driven out of the first electrodes and the third electrode simultaneously and couple the first electrode to be driven and the third electrode to the driver.

(4) The display device according to (3), wherein
the display device has a first detection mode for detecting an object to be detected in the display region and a second detection mode for detecting an object to be detected in the peripheral region, and
the scanner selects the first electrodes in units of a drive electrode block including a plurality of the first electrodes in the first detection mode and selects the third electrode and at least one of the first electrodes facing the third electrode in planar view simultaneously in the second detection mode.

(5) The display device according to (4), wherein
the scanner includes a switch configured to couple the first electrodes included in the drive electrode block, and
the scanner operates the switch to select the first electrodes included in the drive electrode block simultaneously in the first detection mode and operates the switch to select at least one of the first electrodes facing the third electrode out of the first electrodes included in the drive electrode block in the second detection mode.

(6) The display device according to (4), wherein
the scanner includes a shift register, and
the shift register sequentially supplies a scanning signal to the drive electrode block and the third electrode.

(7) The display device according to (6), wherein
a plurality of the shift registers are provided corresponding to the drive electrode block and the third electrode, and
the shift register provided corresponding to the third electrode supplies the same scanning signal to the third electrode and the first electrode to be driven.

(8) The display device according to (1), wherein the second electrode outputs, to a detector, a sensor output signal corresponding to a change in capacitance between the second electrode and the first electrodes and a change in capacitance between the second electrode and the third electrode.

(9) The display device according to (1), wherein
the first electrodes are arrayed in a first direction and extending in a second direction intersecting the first direction in planar view, and
a plurality of third electrodes are provided facing in the first direction, and the first electrodes are disposed between the third electrodes facing in the first direction.

(10) The display device according to (9), wherein
a plurality of the second electrodes extend in the first direction and are arrayed in the second direction in planar view, and
the third electrodes are disposed facing an end of the second electrode.

(11) The display device according to (1), wherein the third electrode is disposed to a layer different from layers of the first electrodes and the second electrode.

(12) The display device according to (1), further comprising:
a cover substrate facing the first substrate in the direction perpendicular to the surface of the first substrate, wherein
the third electrode is provided in the peripheral region of the cover substrate.

(13) The display device according to (1), wherein a plurality of the third electrodes are provided surrounding the first electrodes in areas along four sides of the peripheral region in planar view.

(14) The display device according to (1), further comprising:
a plurality of pixel electrodes disposed in a matrix in the display region of the first substrate; and
a display functional layer configured to implement an image display function.

(15) The display device according to (14), wherein the driver supplies a display drive signal to the first electrodes in a display period for displaying an image.

(16) The display device according to (1), further comprising:
a second substrate facing the first substrate, wherein
the second electrode is provided to the second substrate.

What is claimed is:

1. A display device comprising:
a first substrate;
a plurality of first electrodes disposed in a display region of the first substrate;
a second electrode facing the first electrodes in a direction perpendicular to a surface of the first substrate and configured to form capacitance between the second electrode and the first electrodes;
a third electrode provided in a peripheral region positioned on the outside of the display region and not overlapping the first electrodes in planar view;
a driver configured to supply a drive signal to the third electrode and at least one first electrode out of the first electrodes simultaneously; and
a scanner configured to select the at least one first electrode to be driven out of the first electrodes and the third electrode simultaneously and couple the at least one first electrode to be driven and the third electrode to the driver,
wherein
the display device has a first detection mode for detecting an object to be detected in the display region and a second detection mode for detecting an object to be detected in the peripheral region,
the scanner selects the first electrodes in units of a drive electrode block including a plurality of the first electrodes in the first detection mode and selects the third electrode and the at least one first electrode facing the third electrode in planar view simultaneously in the second detection mode,
the scanner includes a switch configured to couple the first electrodes included in the drive electrode block, and
the scanner operates the switch to select the first electrodes included in the drive electrode block simultaneously in the first detection mode and operates the switch to select the at least one first electrode facing the third electrode out of the first electrodes included in the drive electrode block in the second detection mode.

2. The display device according to claim 1, wherein the at least one first electrode is disposed closer to the third electrode than the other first electrodes.

3. A display device comprising:
a first substrate;
a plurality of first electrodes disposed in a display region of the first substrate;
a second electrode facing the first electrodes in a direction perpendicular to a surface of the first substrate and configured to form capacitance between the second electrode and the first electrodes;
a third electrode provided in a peripheral region positioned on the outside of the display region and not overlapping the first electrodes in planar view;
a driver configured to supply a drive signal to the third electrode and at least one first electrode out of the first electrodes simultaneously; and
a scanner configured to select the at least one first electrode to be driven out of the first electrodes and the third electrode simultaneously and couple the at least one first electrode to be driven and the third electrode to the driver,
wherein
the display device has a first detection mode for detecting an object to be detected in the display region and a second detection mode for detecting an object to be detected in the peripheral region,
the scanner selects the first electrodes in units of a drive electrode block including a plurality of the first electrodes in the first detection mode and selects the third electrode and the at least one first electrode facing the third electrode in planar view simultaneously in the second detection mode,
the scanner includes a shift register,
the shift register sequentially supplies a scanning signal to the drive electrode block and the third electrode,
a plurality of the shift registers are provided corresponding to the drive electrode block and the third electrode, and
the shift register provided corresponding to the third electrode supplies the same scanning signal to the third electrode and the at least one first electrode to be driven.

4. The display device according to claim 1, wherein the second electrode outputs, to a detector, a sensor output signal corresponding to a change in capacitance between the second electrode and the first electrodes and a change in capacitance between the second electrode and the third electrode.

5. The display device according to claim 1, wherein
the first electrodes are arrayed in a first direction and extending in a second direction intersecting the first direction in planar view, and
a plurality of third electrodes are provided facing in the first direction, and the first electrodes are disposed between the third electrodes facing in the first direction.

6. The display device according to claim 5, wherein
a plurality of the second electrodes extend in the first direction and are arrayed in the second direction in planar view, and
the third electrodes are disposed facing an end of the second electrode.

7. The display device according to claim 1, wherein the third electrode is disposed to a layer different from layers of the first electrodes and the second electrode.

8. The display device according to claim 1, further comprising:
a cover substrate facing the first substrate in the direction perpendicular to the surface of the first substrate, wherein
the third electrode is provided in the peripheral region of the cover substrate.

9. The display device according to claim 1, wherein a plurality of the third electrodes are provided surrounding the first electrodes in areas along four sides of the peripheral region in planar view.

10. The display device according to claim 1, further comprising:
a plurality of pixel electrodes disposed in a matrix in the display region of the first substrate; and
a display functional layer configured to implement an image display function.

11. The display device according to claim 10, wherein the driver supplies a display drive signal to the first electrodes in a display period for displaying an image.

12. The display device according to claim 1, further comprising:
a second substrate facing the first substrate, wherein
the second electrode is provided to the second substrate.

13. The display device according to claim 3, wherein the at least one first electrode is disposed closer to the third electrode than the other first electrodes.

14. The display device according to claim 3, wherein the second electrode outputs, to a detector, a sensor output signal corresponding to a change in capacitance between the second electrode and the first electrodes and a change in capacitance between the second electrode and the third electrode.

15. The display device according to claim 3, wherein
the first electrodes are arrayed in a first direction and extending in a second direction intersecting the first direction in planar view, and
a plurality of third electrodes are provided facing in the first direction, and the first electrodes are disposed between the third electrodes facing in the first direction.

16. The display device according to claim 15, wherein
a plurality of the second electrodes extend in the first direction and are arrayed in the second direction in planar view, and
the third electrodes are disposed facing an end of the second electrode.

17. The display device according to claim 3, wherein the third electrode is disposed to a layer different from layers of the first electrodes and the second electrode.

18. The display device according to claim 3, further comprising:
a cover substrate facing the first substrate in the direction perpendicular to the surface of the first substrate, wherein
the third electrode is provided in the peripheral region of the cover substrate.

19. The display device according to claim 3, wherein a plurality of the third electrodes are provided surrounding the first electrodes in areas along four sides of the peripheral region in planar view.

20. The display device according to claim 3 further comprising:
a second substrate facing the first substrate,
wherein the second electrode is provided to the second substrate.

* * * * *